US008992314B2

(12) United States Patent
Gatto et al.

(10) Patent No.: US 8,992,314 B2
(45) **Date of Patent: *Mar. 31, 2015**

(54) UNIVERSAL GAME SERVER

(71) Applicant: IGT, Reno, NV (US)

(72) Inventors: Jean-Marie Gatto, London (GB); Thierry Brunet de Courssou, Broome (AU); Pierre-Jean Beney, London (GB)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,666

(22) Filed: Oct. 1, 2014

(65) Prior Publication Data

US 2015/0018084 A1 Jan. 15, 2015

Related U.S. Application Data

(60) Continuation of application No. 11/130,937, filed on May 16, 2005, now Pat. No. 8,864,576, which is a division of application No. 10/656,631, filed on Sep. 4, 2003, now Pat. No. 8,147,334.

(51) Int. Cl.
*G07F 17/32* (2006.01)
*A63F 13/12* (2006.01)

(52) U.S. Cl.
CPC ........ *G07F 17/3225* (2013.01); *G07F 17/3244* (2013.01)
USPC ........................................................ 463/29

(58) Field of Classification Search
CPC ......................... G07F 17/3225; G07F 17/3244
USPC ........................................................ 463/29
See application file for complete search history.

(56) References Cited

U.S. PATENT DOCUMENTS

| | | | |
|---|---|---|---|
| 5,018,736 | A | 5/1991 | Pearson et al. |
| 5,042,809 | A | 8/1991 | Richardson |
| 5,263,723 | A | 11/1993 | Pearson et al. |
| 5,324,035 | A | 6/1994 | Morris et al. |

(Continued)

FOREIGN PATENT DOCUMENTS

WO 03013675 A1 2/2003

OTHER PUBLICATIONS

RSA Security, Brochure entitled, "RSA BSAFE Crypto-C Cryptographic components for C" (2 pages).

(Continued)

*Primary Examiner* — David L Lewis
*Assistant Examiner* — Matthew D Hoel
(74) *Attorney, Agent, or Firm* — Griffiths & Seaton PLLC

(57) ABSTRACT

A gaming system that executes a web browser to display games produced by the at least one server, take over processing from the web browser using a plug-in for the web browser upon detection of a predetermined player interaction with the web browser, carries out a game transaction, using the plug-in for the web browser, including a game bet and an amount wagered for each game played, commits each game transaction, using the plug-in for the web browser, by sending at least the game bet and the amount wagered to the at least one server and to receive a validation transaction corresponding to the committed game transaction back from the at least one server, and relinquishes control, using the plug-in for the web browser, back to the web browser upon receipt of the validation transaction from the at least one server.

14 Claims, 28 Drawing Sheets

(56) References Cited

U.S. PATENT DOCUMENTS

| | | | | |
|---|---|---|---|---|
| 5,429,361 | A | 7/1995 | Raven et al. | |
| 5,701,480 | A | 12/1997 | Raz | |
| 5,707,286 | A | 1/1998 | Carlson | |
| 5,768,510 | A | 6/1998 | Gish | |
| 5,816,918 | A | 10/1998 | Kelly et al. | |
| 5,884,014 | A | 3/1999 | Huttenlocher et al. | |
| 5,890,963 | A | 4/1999 | Yen | |
| 5,971,854 | A | 10/1999 | Pearson et al. | |
| 6,007,426 | A | 12/1999 | Kelly et al. | |
| 6,015,348 | A | 1/2000 | Lambright et al. | |
| 6,077,163 | A | 6/2000 | Walker et al. | |
| 6,104,815 | A | 8/2000 | Alcorn et al. | |
| 6,179,713 | B1 | 1/2001 | James et al. | |
| 6,182,086 | B1 | 1/2001 | Lomet et al. | |
| 6,210,274 | B1 | 4/2001 | Carlson | |
| 6,266,056 | B1 | 7/2001 | Kanungo | |
| 6,428,413 | B1 | 8/2002 | Carlson | |
| 6,477,550 | B1 | 11/2002 | Balasubramaniam et al. | |
| 6,490,610 | B1 | 12/2002 | Rizvi et al. | |
| 6,529,932 | B1 | 3/2003 | Dadiomov et al. | |
| 6,604,106 | B1 * | 8/2003 | Bodin et al. | 707/999.01 |
| 6,659,861 | B1 | 12/2003 | Faris et al. | |
| 6,662,213 | B1 | 12/2003 | Xie et al. | |
| 6,749,510 | B2 | 6/2004 | Giobbi | |
| 6,758,755 | B2 | 7/2004 | Kelly et al. | |
| 6,821,205 | B2 | 11/2004 | Takahashi et al. | |
| 6,823,523 | B1 | 11/2004 | Campbell et al. | |
| 6,912,569 | B1 | 6/2005 | Sharma et al. | |
| 6,968,405 | B1 | 11/2005 | Bond et al. | |
| 6,986,055 | B2 | 1/2006 | Carlson | |
| 7,022,017 | B1 | 4/2006 | Halbritter et al. | |
| 7,099,939 | B2 | 8/2006 | Von Klopp et al. | |
| 7,128,652 | B1 | 10/2006 | Lavoie et al. | |
| 7,155,158 | B1 | 12/2006 | Iuppa et al. | |
| 7,171,614 | B2 | 1/2007 | Allor | |
| 7,186,181 | B2 | 3/2007 | Rowe | |
| 7,194,764 | B2 | 3/2007 | Martherus et al. | |
| 7,203,756 | B2 | 4/2007 | Tapperson | |
| 7,260,834 | B1 | 8/2007 | Carlson | |
| 7,303,473 | B2 | 12/2007 | Rowe | |
| 7,431,650 | B2 | 10/2008 | Kessman et al. | |
| 7,435,184 | B1 | 10/2008 | Tsujita | |
| 7,452,277 | B2 | 11/2008 | Takahashi et al. | |
| 2001/0031663 | A1 * | 10/2001 | Johnson | 463/42 |
| 2001/0042016 | A1 | 11/2001 | Muyres et al. | |
| 2001/0044339 | A1 * | 11/2001 | Cordero et al. | 463/42 |
| 2001/0049297 | A1 | 12/2001 | Hibscher et al. | |
| 2001/0056405 | A1 | 12/2001 | Muyres et al. | |
| 2002/0002074 | A1 | 1/2002 | White et al. | |
| 2002/0002488 | A1 | 1/2002 | Muyres et al. | |
| 2002/0052230 | A1 | 5/2002 | Martinek et al. | |
| 2002/0062369 | A1 | 5/2002 | Von Klopp et al. | |
| 2002/0065911 | A1 | 5/2002 | Von Klopp et al. | |
| 2002/0069076 | A1 | 6/2002 | Faris et al. | |
| 2002/0128065 | A1 | 9/2002 | Chung et al. | |
| 2002/0128066 | A1 | 9/2002 | Namba et al. | |
| 2002/0147040 | A1 | 10/2002 | Walker et al. | |
| 2002/0156931 | A1 | 10/2002 | Riedel | |
| 2003/0008712 | A1 | 1/2003 | Poulin | |
| 2003/0027639 | A1 | 2/2003 | Peterson et al. | |
| 2003/0199315 | A1 | 10/2003 | Downes | |
| 2003/0211881 | A1 | 11/2003 | Walker et al. | |
| 2003/0226102 | A1 | 12/2003 | Allor | |
| 2003/0228910 | A1 | 12/2003 | Jawaharlal et al. | |
| 2004/0209660 | A1 | 10/2004 | Carlson et al. | |
| 2008/0147354 | A1 * | 6/2008 | Rowan et al. | 702/182 |
| 2008/0147420 | A1 * | 6/2008 | Rowan et al. | 705/1 |
| 2008/0147424 | A1 * | 6/2008 | Rowan et al. | 705/1 |

OTHER PUBLICATIONS

Intel Corporation, Intel Platform Security Division, "The Intel Random Number Generator," pp. 1-12, 1999 (12 pages).

McGehee, Brad, "An Introduction to SQL Clustering," [online], Jun. 24, 2001, [retrieved Jun. 29, 2005, from http://www.sql-server-performance.com/clustering_Introl1.asp (10 pages).

International Search Report mailed Aug. 2, 2005, in related International Application No. PCT/US04/28935, filed Sep. 2, 2004 (4 pages).

Written Opinion mailed Aug. 2, 2005, in related International Application No. PCT/US04/28935, filed Sep. 2, 2004 (8 pages).

Office Action mailed Jun. 15, 2007, in related U.S. Appl. No. 10/656,631, filed Sep. 4, 2003 (12 pages).

Office Action mailed Sep. 13, 2007, in related U.S. Appl. No. 10/656,631, filed Sep. 4, 2003 (14 pages).

Final Office Action mailed May 1, 2008, in parent U.S. Appl. No. 10/656,631, filed Sep. 4, 2003 (21 pages).

Office Action mailed Jul. 23, 2008 in related U.S. Appl. No. 11/131,137, filed May 16, 2005 (17 pages).

Final Office Action mailed Jan. 16, 2009 in related U.S. Appl. No. 11/131,137, filed May 16, 2005 (18 pages).

Office Action mailed Nov. 9, 2009 in related U.S. Appl. No. 11/735,994, filed Apr. 16, 2007 (10 pages).

Supplementary European Search Report of Mar. 31, 2010 in related EP Application 04783247.2 (5 pages).

Office Action of Apr. 12, 2010 in related U.S. Appl. No. 11/131,137, filed May 16, 2005 (8 pages).

Office Action of Oct. 13, 2010 in related U.S. Appl. No. 10/656,631, filed Sep. 4, 2003 (17 pages).

Office Action mailed Oct. 19, 2010 in related U.S. Appl. No. 11/131,137, filed May 16, 2005 (9 pages).

Office Action of Apr. 11, 2011 in related U.S. Appl. No. 10/656,631, filed Sep. 4, 2003 (9 pages).

Mockapetris, Paul, "Analysis of Reliable Multicast Algorithms for Local Networks," Association for Computing Machinery, 0-89791-113-X/83/0010/0150$00.75, 1983 (8 pages).

* cited by examiner

Retry Model
300

400 Acknowledgement Model

2100

2300

2400

2500

2600

UNIVERSAL GAME SERVER

CROSS-REFERENCE TO RELATED APPLICATIONS

The present application is a Continuation of U.S. patent application Ser. No. 11/130,937 filed on May 16, 2005, which is a Divisional of previously filed application Ser. No. 10/656,631, now issued as U.S. Pat. No. 8,147,334, filed Sep. 4, 2003, from which application priority is hereby claimed under 35 U.S.C. 119(e). This application is related in subject matter to commonly assigned International Application No. PCT/US02/37529, filed Nov. 22, 2002, entitled, "Large Scale Controlled and Secure Data Downloading," which claims priority to U.S. Provisional Application Ser. No. 60/332,522, filed Nov. 23, 2001. The present invention relates in general computing systems, and more particularly to, various embodiments for effecting alternative port recovery mechanisms without significantly impacting an entire computing system.

BACKGROUND OF THE INVENTION

1. Field of Invention

This invention related generally to the field of online gaming as well as interactive TV voting or gaming.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright 2003, Cyberscan Technology Inc., All Rights Reserved.

3. Description of the Related Art

Internet server based merchant sites such as Amazon.com have flourished since the explosion of the Internet. These very high traffic sites rely on a pervasive three-tier model: web page server farm, clustered database server and web browser user interaction. The transactional operations such as adding an item to the shopping cart and proceeding with credit card payment may take in the order of seconds to complete. During heavy traffic, the response time deteriorates rapidly. Transactional data travels via complex paths with multiple speed-optimization caches, via executing machines selected by cookie driven session state management, via imposing clusters and via hugely complex databases. Consequently, zero-loss of data integrity is difficult to guaranty under all possible failure modes. Occasional loss of data integrity is not critical for an online merchant and a manual procedure may be applied to resolve customers' complains. In addition, malicious intrusion, virus contamination and distributed denial of service are a permanent threat.

Internet technologies have matured somewhat and are now relatively simple to implement; solutions can be rapidly developed. Some startup companies are now attempting to apply experience acquired in developing merchant Internet sites to gaming sites including, for example, offshore Internet gaming sites. Evidently, these gaming operations are not regulated and it is not known how these systems perform in comparison with conventional gaming systems such as online state lotteries and online casino slots. Lately, some companies have proposed offshore Internet gaming systems for use in casino and national video lotteries. Disaster tolerance with no interruption of service and zero-loss of data integrity is not even considered.

Although Internet server technology is tempting, it is clear that the Internet server technology is unproven and that due to its hidden complexity, it is immensely difficult to reassure game regulators as to the integrity and security of systems using such Internet server technology. Moreover, gaming laboratories that test and certify gaming systems for compliance with stringent data integrity principles would need to invest considerably in educating their engineers. The "keep-it-simple" principle is still much favored by regulators.

Currently, in order to produce random game outcome, the majority of gaming applications use either software methods or either plug-in hardware generators. Software-only random generators (also called pseudo random generators) are well known for their poor quality in such that knowledge may be acquired allowing to predict the numbers. On the other side, plug-in hardware generators have a simple interface (such as RS232, Parallel port, USB) that can be observed and spoofed. Encrypted plug-in hardware generators are significantly costly and have not made any inroad into the gaming machines such as used in the casinos. In addition, encrypted hardware generators are too slow to be used for server based random generators.

SUMMARY OF THE INVENTION

The above-mentioned shortcomings and untrustworthiness of the prior art are addressed by embodiments of the present invention, which will be understood by reference to the following specification.

It is an object of the present invention to offer a system architecture capable of supporting a distributed online gaming operation such as slip-scan lottery, video lottery, fixed odd betting terminals, Internet gaming and interactive TV.

It is another object of the present invention to offer a system architecture that is configured to concurrently support a number of distributed online gaming operations such as, for example, slip-can lottery, video lottery, fixed odd betting terminals, Internet gaming, and interactive TV. A personality front end resolves the peculiarities of the various client systems before submitting the relevant transactional payload to a trusted transactional cache.

It is another object of the present invention to offer a trusted system architecture. A persistent synchronized auditable trusted log in the trusted server cache isolated from the business server allows most any dispute to be rapidly resolved by reference thereto.

It is still another object of the present invention to offer a disaster tolerant system architecture. A "N-transaction" model is proposed for the differed-draw model, and a geographically separated load-balancing model is proposed for the instant-draw model.

It is yet another object of the present invention to merge trusted game transaction technology with Internet technology in order to benefit of the lower cost of Internet networking.

The methods and systems disclosed herein may advantageously be used in casino environments.

Accordingly, an embodiment of the present invention is an online gaming system, comprising: a communication network; at least two central servers, each of the at least two servers being coupled to the network, and at least one gaming machine coupled to the communication network, each of the at least one gaming machine being configured to carry out a game transaction for each game played and to commit each game transaction to each of the at least two central servers.

Each of the at least two central servers may return a game transaction commit acknowledgment to the at least one gaming machine. The gaming machine may acknowledge to a player a validity of the game transaction upon receipt of at least one game transaction commit acknowledgment during a predetermined timeout period following the commit of the game transaction to each of the at least two central servers. Each game transaction committed to each of the at least two central servers may have an identical inbound game payload comprising at least one of a gaming machine ID, a user/player ID, a transaction GUID, a gaming machine originating/return address, a game ID, a game bet, and an amount wagered. The at least one gaming machine may be configured to be an active participant in a fault tolerance of the online gaming system. The at least one gaming machine may be configured to construct a synchronization log for rebuilding one or a plurality of the at least two central servers upon failure thereof. The online gaming system may be further configured to be rapidly synchronized by using the synchronization log upon returning to its operational state subsequent to failing to communicate with the at least one gaming machine. The communication network may be or include the Internet and a protocol to transport a payload of each game transaction may be UDP, for example. The at least two central servers and the at least one gaming machine may be configured to support instant-draw and deferred-draw of random events. The at least two central servers may be geographically remote from one another. Each of the at least two central servers may include a trusted transactional cache, the trusted transactional cache being configured to process each committed game transaction, and to provide real time persistent storage and logging of aspects of each committed game transaction. The at least two central servers may further comprise at least one of the trusted transactional cache, a business server and a logistic support server.

According to another embodiment thereof, the present invention is an online gaming system, comprising a communication network; at least two geographically dispersed central servers, each of the at least two geographically dispersed central servers being coupled to the communication network, at least two gaming machines, each of the at least two gaming machines being coupled to the communication network and being configured to carry out a game transaction for each game played, the at least two gaming machines being configured to carry out load balancing when committing the game transactions to the at least two geographically dispersed central servers over the communication network.

The load balancing may include having each gaming machine selecting only one of the at least two geographically dispersed central servers to which to commit the game transaction. The communication network may be the Internet and a protocol to transport a payload of each game transaction may be UDP, for example. The at least two central servers and the at least two gaming machines may be configured to support instant-draw and deferred-draw of random events. The at least two geographically dispersed central servers may each further comprise a trusted transactional cache, the trusted transactional cache being configured to process each committed game transaction, and to provide real time persistent storage and logging of aspects of each committed game transaction. The at least two geographically dispersed central servers may further comprise at least one of a trusted transactional cache, a business server and logistic support server.

According to still another embodiment thereof, the present invention is an online gaming system, comprising: a communication network; a plurality of gaming machines, each of the plurality of gaming machines being configured to carry out game transactions and being coupled to the communication network, and N geographically dispersed central servers, each of the N geographically dispersed central servers being coupled to the communication network, selected one of the plurality of gaming machines being further configured to perform load balancing when committing transactions to the N geographically dispersed central servers and selected ones of the plurality of gaming machines being configured to commit game transactions to each of the N geographically dispersed central servers.

The load balancing may include having each gaming machine selecting only one of the N geographically dispersed central servers to which to commit the game transaction. Each of the N geographically dispersed central servers may be configured to return a game transaction commit acknowledgment to the gaming machine that initiated the transaction commit over the communication network. The gaming machine may acknowledge to the player the validity of the game transaction upon receipt of at least one game transaction commit acknowledgment during a predetermined timeout period following the commit of the game transaction to each of the N geographically dispersed central servers. Each game transaction committed to each of the N geographically dispersed central servers may have an identical inbound game payload comprising at least a selected set of the at least one gaming machine ID, the user/player ID, the transaction GUID, the gaming machine originating/return address, the game ID, the game bet, and the amount wagered. The communication network may include the Internet and a protocol to transport a payload of each of the game transactions may be UDP, for example. The N geographically dispersed central servers and the plurality of gaming machines may be configured to support instant-draw and deferred-draw of random events. The N geographically dispersed central servers may each further comprise a trusted transactional cache, the trusted transactional cache being configured to process each committed game transaction, and to provide real time, secure and persistent storage and logging of aspects of each committed game transaction. Each of the N geographically dispersed central servers may further comprise at least one of a trusted transactional cache, a business server and logistic support server.

An embodiment of the present invention is an online gaming system, comprising a plurality of gaming machines, each of the plurality of gaming machines being configured to generate and send an inbound transaction packet that may include an inbound transaction payload across at least one of a plurality of communication networks according to one of a plurality of communication protocols; at least one central server coupled to the plurality of communication networks and to each of the at least one central servers, the at least one central server including: at least one transaction engine configured to process inbound transaction payloads to generate corresponding outbound transaction payloads; a personality front end, the personality front end being configured to interface with each of the plurality of communication networks to receive inbound transaction packets from the plurality of gaming machines, to extract the inbound transaction payloads from the received inbound transaction packets, to submit the extracted inbound payloads to the at least one transaction engine, to generate outbound transaction packets that may include the corresponding outbound transaction payloads and to send the generated outbound transaction packets to a selected one of the plurality of gaming machines.

The inbound transaction payload may include at least one of a gaming machine ID, a user/player ID, a transaction GUID, a terminal originating/return address, a game ID, a game bet, and an amount wagered. The personality front end may be further configured to transcode specific transaction payloads produced by the plurality of gaming terminals into generic transaction payloads. The plurality of communication networks may include at least one of dial-up, X25, Frame Relay, leased line, Internet and VPN, for example. The communication protocol(s) may be selected from one of proprietary, X25, TCP/IP, UDP, HTTP, XML and SOAP protocols, for example.

The present invention, according to another embodiment thereof, is a game random number generator for supplying random game numbers to a gaming machine, comprising at least one hardware number generator configured to provide random number seeds at t predetermined rate, and at least one pseudo-random number generator coupled to the at least one hardware number generator, the at least one pseudo-random number generator being configured to generate the random game numbers from the random number seeds generated by the at least one hardware number generator.

The game random number generator may further include a first trusted log configured to securely log all of random number seeds generated by the at least one hardware generator. The game random number generator may further include a second trusted log configured to supply game random numbers on demand for each individual game draw within the gaming machine. The game random number generator may further include at least one game result assembler coupled to the at least one pseudo-random number generator, the at least one game result assembler being configured to receive random game numbers produced by the at least one pseudo-random number generator and to generate ranging random game numbers. For example, the at least one hardware random number generator may be one of a RNG of Intel 8XX series of PC motherboard chipsets, the chipset being integrated on a motherboard of a computer within the gaming machine; a RNG of a secure smart card communicating with the computer within the gaming machine; a RNG of a secure smart device communicating with the computer of the gaming machine; a RNG of a processor compliant with Microsoft Next-Generation Secure Computing Base, the processor being integrated on the motherboard of the computer of the gaming machine; a RNG of a motherboard chipset compliant with Microsoft Next-Generation Secure Computing Base, the chipset being integrated on the motherboard of the computer of the gaming machine; a RNG of a security plug-in device communicating with the computer within the gaming machine, and/or a RNG of an add-on card or add-on board security device communicating with the computer within the gaming machine.

The present invention, according to another embodiment thereof, may also be viewed as a gaming system comprising at least one gaming machine; at least one central game server coupled to the at least one gaming machine over a network, the at least one central game server including: at least one hardware number generator configured to provide random number seeds at a predetermined rate, and at least one pseudo-random number generator couple to the at least one hardware number generator, the at least one pseudo-random number generator being configured to generator, on demand, the random game numbers from the random number seeds generated by the at least one hardware number generator.

The gaming system may further include a first trusted log configured to securely log all of random number seeds generated by the at least one hardware number generator. The gaming system may further include a second trusted log configured to securely log all of random game numbers generated by the at least one pseudo-random number generator. The at least one pseudo-number generator may be configured to supply game random numbers on demand for each individual game draw within the gaming machine. The gaming system may further include at least one game result assembler coupled to the at least one pseudo-random number generator, the at least one game result assembler being configured to receive random game numbers produced by the at least one pseudo-random number generator and to generate ranging random game numbers. The at least one hardware random number generator may be one of, for example, a RNG of Intel 8XX series of PC motherboard chipsets, the chipset being integrated on a motherboard of a computer within the gaming machine; a RNG of a secure smart card communicating with the computer within the gaming machine; a RNG of a secure smart device communicating with the computer of the gaming machine; a RNG of a processor compliant with Microsoft Next-Generation Secure Computing Base, the processor being integrated on the motherboard of the computer of the gaming machine; a RNG of a motherboard chipset compliant with Microsoft Next-Generation Secure Computing Base, the chipset being integrated on the motherboard of the computer of the gaming machine; a RNG of security plug-in device communicating with the computer within the gaming machine, and/or a RNG of an add-on card or add-on board security device communicating with the computer within the gaming machine.

According to another embodiment, the present invention is a gaming system comprising at least one gaming machine, including: at least one first hardware number generator configured to provide random number seeds at a predetermined rate, and at least one first pseudo-random number generator coupled to the at least one first hardware number generator, the at least one first pseudo-random number generator being configured to generate, on demand, the random game numbers from the random number seeds generated by the at least one first hardware number generator for each game draw performed at the at least one gaming machine; at least one central game server coupled to the at least one gaming machine, the central game server including: at least one second hardware number generator configured to provide random number seeds at a predetermined rate, and at least one second pseudo-random number generator coupled to the at least one second hardware number generator, the at least one second pseudo-random number generator being configured to generate, on demand, the random game numbers from the random number seeds generated by the at least one second hardware number generator for each game draw performed at the at least one gaming machine.

The gaming system may further include a first trusted log configured to securely log all of random number seeds generated by the at least one first hardware number generator, and a second trusted log configured to securely log all of random number seeds generated by the at least one second hardware number generator. The gaming system may further include: a third trusted log configured to securely log all of random game numbers generated by the at least one first pseudo-random number generator, and a fourth trusted log configured to securely log all of random game numbers generated by the at least one second pseudo-random number generator. The first and second hardware random number generators may be identical. The first and second pseudo random number generators may be identical. The at least one gaming machine may be configured to select at least one random game number for each game draw from the at least one first pseudo-random number generator or from the second pseudo-random number generator. The gaming system may further include at least one game result assembler coupled to the at least one first pseudo-random number generator or to the at least one second pseudo-random number generator, the at least one game result assembler being configured to receive random game numbers produced by the first or second pseudo-random number generators and to generate ranging random game numbers. The first or second hardware random number generator may be one of, for example, a RNG of Intel 8XX (series of PC motherboard chipsets, the chipset being integrated on a motherboard of a computer within the gaming machine; a RNG of a secure smart card communicating with the computer within the gaming machine; a RNG of a secure smart device communicating with the computer of the gaming machine; a RNG of a processor compliant with Microsoft Next-Generation Secure Computing Base, the processor being integrated on the motherboard of the computer of the gaming machine; a RNG of a motherboard chipset compliant with Microsoft Next-Generation Secure Computing Base, the chipset being integrated on the motherboard of the computer of the gaming machine; a RNG of a security plug-in device communicating with the computer within the gaming machine, and/or a RNG of an add-on card or add-on board security device communicating with the computer within the gaming machine.

According to still another embodiment, the present invention may be viewed as a gaming machine configured to execute game draws whose outcome depend upon random game numbers, the gaming machine comprising: at least one hardware number generator configured to provide random number seeds at a predetermined rate, and at least one pseudo-random number generator coupled to the at least one hardware number generator, the at least one pseudo-random number generator being configured to generate the random game numbers from the random number seeds generated by the at least one hardware number generator.

The gaming machine may further include a first trusted log configured to securely log all of random number seeds generated by the at least one hardware number generator. The gaming machine may further include a second trusted log configured to securely log all of random game numbers generated by the at least one pseudo-random number generator.

Another embodiment of the present invention may be defined as a gaming system comprising: a communication network; at least one central web server, each of the at least one central web server being coupled to the network, at least one central transaction server, each of the at least one central transaction server being coupled to the network and, at least one web browser based gaming machine coupled to the communication network, each of the at least one web browser based gaming machine comprising: a standard web browser being configured to display rich page content and animations of the game produced by the at least one central web server, and a plug-in for the standard web browser, the plug-in being configured to carry out a game transaction for each game played and to commit each game transaction to the at least one central transaction server.

The communication network may be or include the Internet. The plug-in may be configured to complete the game transaction upon receipt of a validation transaction from the at least one central transaction server. The committed game transaction may include an inbound game payload comprising at least one of a gaming machine ID, a user/player ID, a transaction GUID, a gaming machine originating/return address, a game ID, a game bet, and an amount wagered. The validation transaction from the at least one central transaction server may include an outbound packet comprising at least one of a gaming machine ID, a user/player ID, a transaction GUID, and an outcome of the game. The plug-in may be further configured to commit each game transaction to each of the at least one central transaction servers.

Yet another embodiment of the present invention is an on-line gaming system, comprising a communication network; at least two central servers, each of the at least two central servers being couple to the communication network; at least one gaming machine coupled to the communication network, each of the at least one gaming machine being configured to carry out a game transaction for each game played and to commit each game transactions to each of the at least two central servers; each of the at least two central servers may include a trusted transactional cache, the trusted transactional cache being configured to process each committed game transaction and each of the at least one gaming machine may be configured to actively participate in a continued availability of the gaming system by contributing to a building of a synchronization log such that a failed trusted transaction cache may be synchronized using the synchronization log upon the failed trusted transactional cache returning to an operational state.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Figure 1:
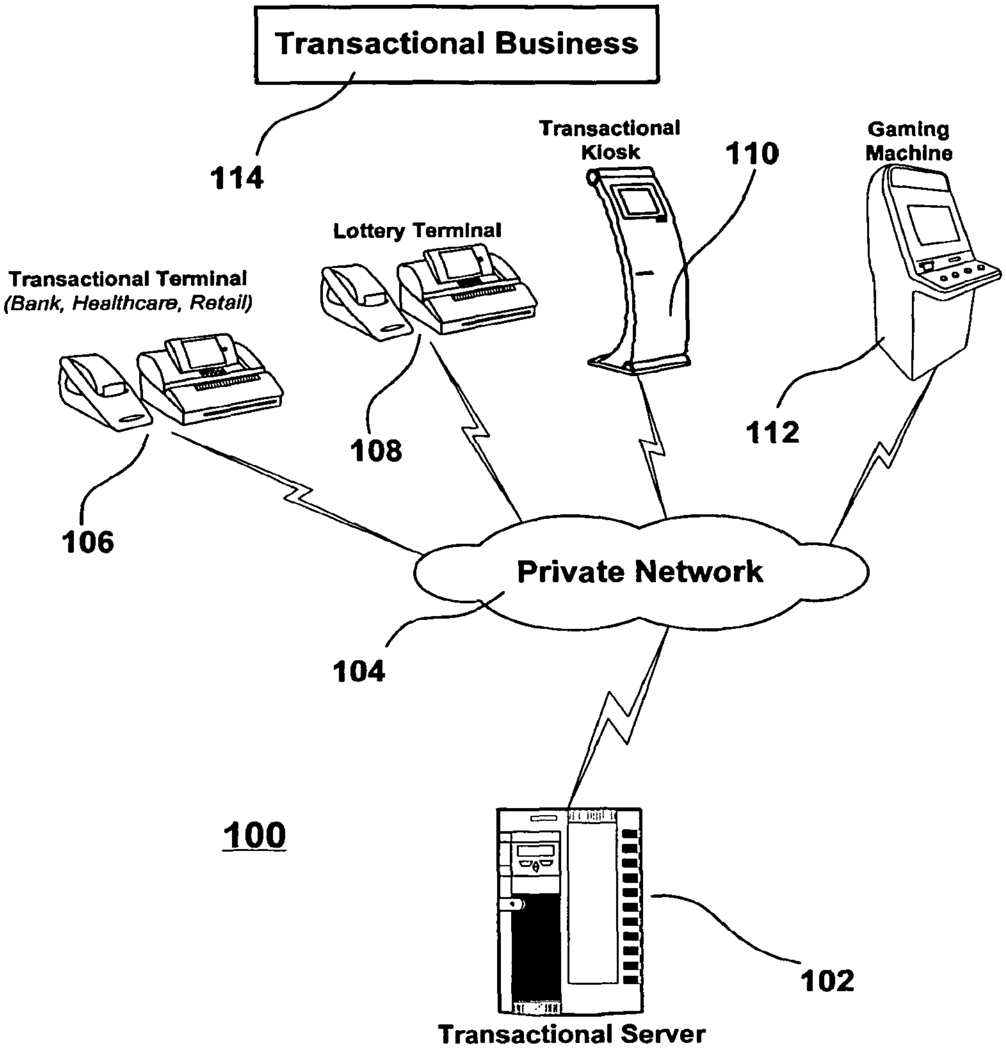
FIG. 1 shows a conventional secure online transactional topology.

FIG. 1 illustrates a conventional secure online transaction topology used for transactional business application 114 such as banking, healthcare or retail terminals 106, lottery terminal 108, transactional kiosk 110 and video gaming machines 112. Typically, a transactional server 102 communicated with online terminals 106, 108, 110, 112 via a private network 104. Within the context of the present invention, the terms “online terminal”, “terminal”, “game machine” and “gaming machine” and their corresponding plural forms are interchangeable and may be substituted for one another without loss of meaning or generality. Large-scale conventional transactional systems have been conceived for slow, unreliable and expensive private networks 104 prior to the Internet era; as a result, the application layer protocols on which they are based are somewhat simple, although exceptionally efficient and able to fully recover from errors. The X25 protocol and derivatives thereof for the link layer were universally favored for private networking until secure Internet solutions such as VPN and IPSec have become widely available and trusted. When applied to new generation high bandwidth networks, these protocols provide ultra fast transactional services.

Figure 2:
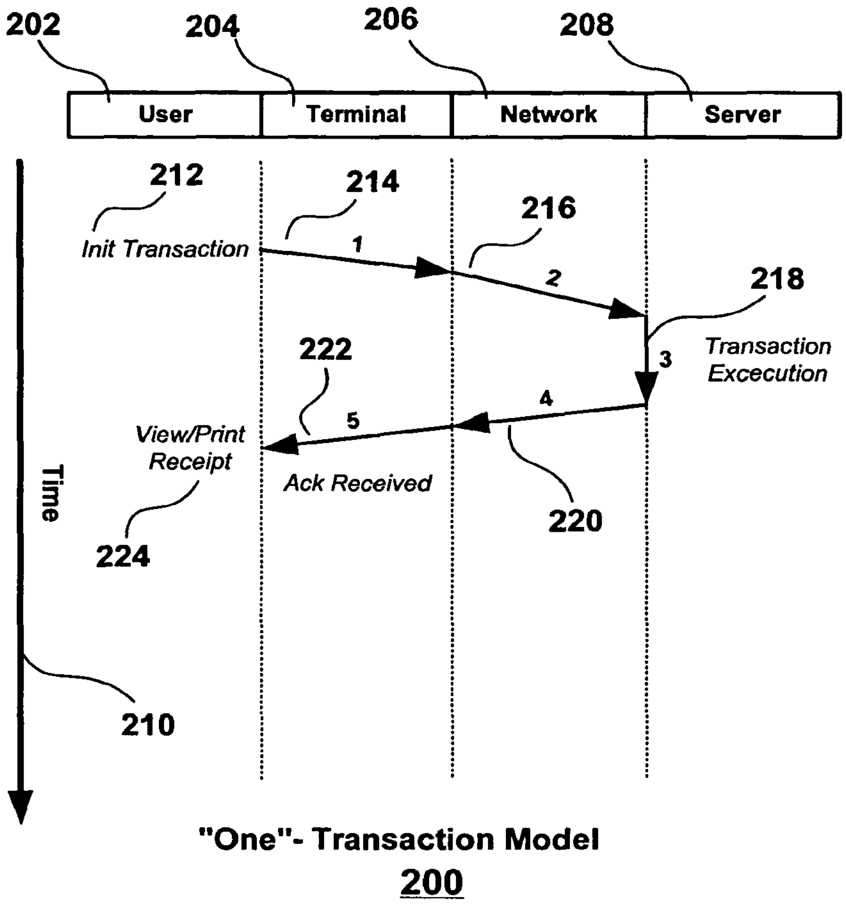
FIG. 2 shows conventional transaction initiation model.

FIG. 2 shows a proven transaction model 200 used as application layer for the conventional secure online transactional business and illustrates the slow of transactional information over time from the user 202 to the terminal 204, through the network 206 to the server 208. In this model, the terminal is the “transaction master”, that is, a transaction 212 is always initiated at the terminal 204 and is terminated at the terminal by the printing or viewing of an acknowledgment or receipt, as shown at 224. The time axis 210 is oriented from top to bottom. Furthermore, as will be described later, the terminal is entirely responsible for the recovery of any error that may occur in the network path. In a typical transaction in which no error occurs, a user 202 initiates a transaction 212 at terminal 204. This transaction initiation may be the result of clicking on a submit button on a dialog entry form, pressing a play button on a gaming machine or the result of a play-slip presented and scanned into a lottery scanner. Upon transaction initialization, the terminal 204 executes a process 214 concluded by the forwarding of a communication packet 216 to the network 206. The server 208 receives the inbound packet 216 on which it executes the transaction 218. At the conclusion of transaction 218, the server 208 generates and returns an outbound communication packet 220 that is forwarded to the network 206. Upon successful receipt of the packet 220, the terminal 204 examines the server acknowledge signal received at 222. Upon successful identification of the server acknowledgment signal, the terminal issues a receipt 224 to the user 202 or alternatively displays the receipt.

In general, the series of actions and/or processes initiated by a user (or an equivalent automated process) leading to the forwarding of an inbound transaction packet to the transaction server is called “committing a transaction” or “a transaction commit”.

Figure 3:
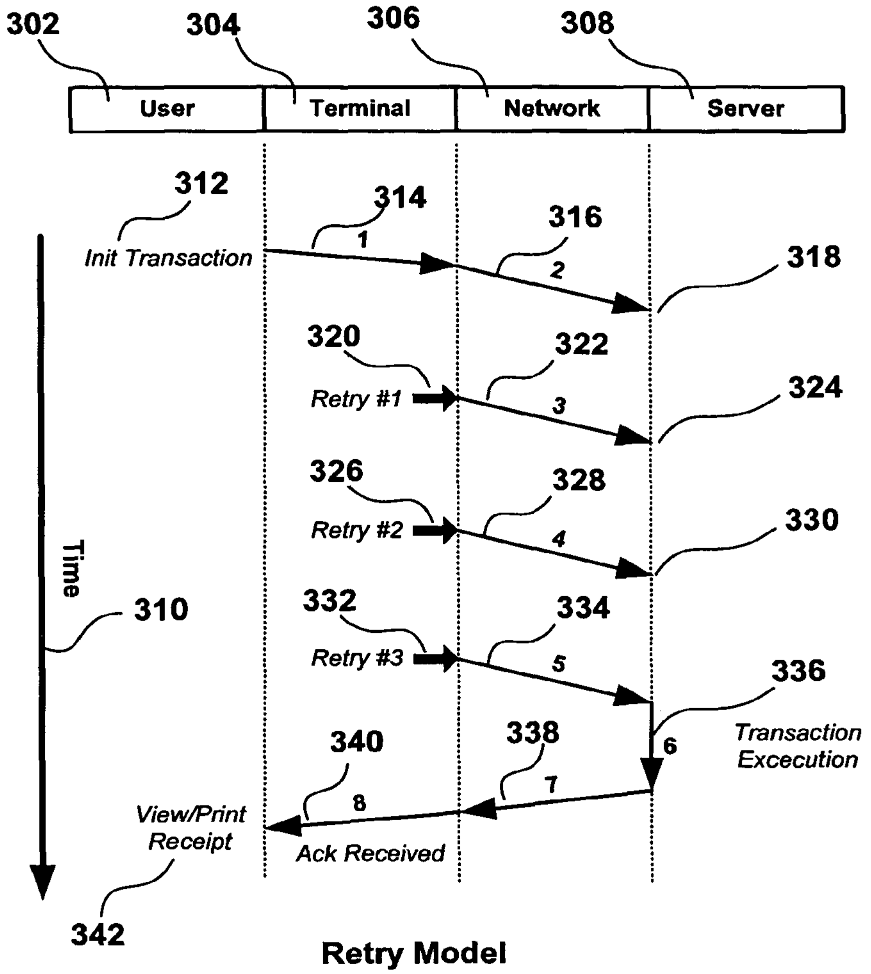
FIG. 3 shows a conventional transaction retry model, according to an embodiment of the present invention.

In order to make a distinction with the “N” transaction model that will be detailed later in this document, the conventional model 200 of FIG. 2 is called the “One” transaction model. FIG. 3 illustrates a proven retry model 300 used for the conventional secure online transactional business. The terminal will continually keep retrying to send a transaction commit until a server acknowledgment is received. In this extremely simple error recovery model, it is not necessary to know where exactly the failure has occurred. The failure may have occurred at any point along the path of the transaction. FIG. 3 shows the case in which three recovery attempts are made. The user 302 initiates a transaction 312, then the terminal 304 executes the process 314, whereupon a corresponding transaction packed is forwarded at 316 to the network 306.

It is now assumed that a failure along the network path 306 prevents the server 308 from receiving the inbound packet at its interface, as shown at 318. After a predetermined time-out, the terminal 304 determines that the server acknowledgment has been received. Consequently, the terminal 304 re-sends the transaction packet (retry #1 320) that is forwarded at 322 to the network 306.

Another failure along the network path 306 now prevents the server 308 from receiving the inbound packet at its interface, as shown at 324. After a predetermined time-out, the terminal 304 again determines that no server acknowledgment has been received, and again re-sends the transaction packet (retry #3 326) that is forwarded at 328 to the network 306.

A third failure along the network path 306 now prevents the server 308 from receiving the inbound packet at its interface, as shown at 330. After a predetermined time-out, the terminal 304 again determines that no server acknowledgment has been received, consequently, it re-sends the transaction packet (retry #3 332) that is forwarded at 334 to the network 306.

The server 308 receives the inbound packet 334 on which it executes the transaction, as shown at 336. At the conclusion of process 336, the server generates and returns an outbound communication packet 338 that is forwarded to the network 306. Upon successful receipt of the packet 338, the terminal 304 executes process 340 and examines the server acknowledge signal 341. Upon successful identification of the server acknowledge signal, the terminal issues a receipt 342 to the user 302 or alternatively displays the receipt.

Should a duplicate server outbound packet be received by the terminal, because for example of excessive time delay in the communication link which triggered the terminal to initiate a retry, the duplicate or duplicate packets are simply ignored.

Figure 4:
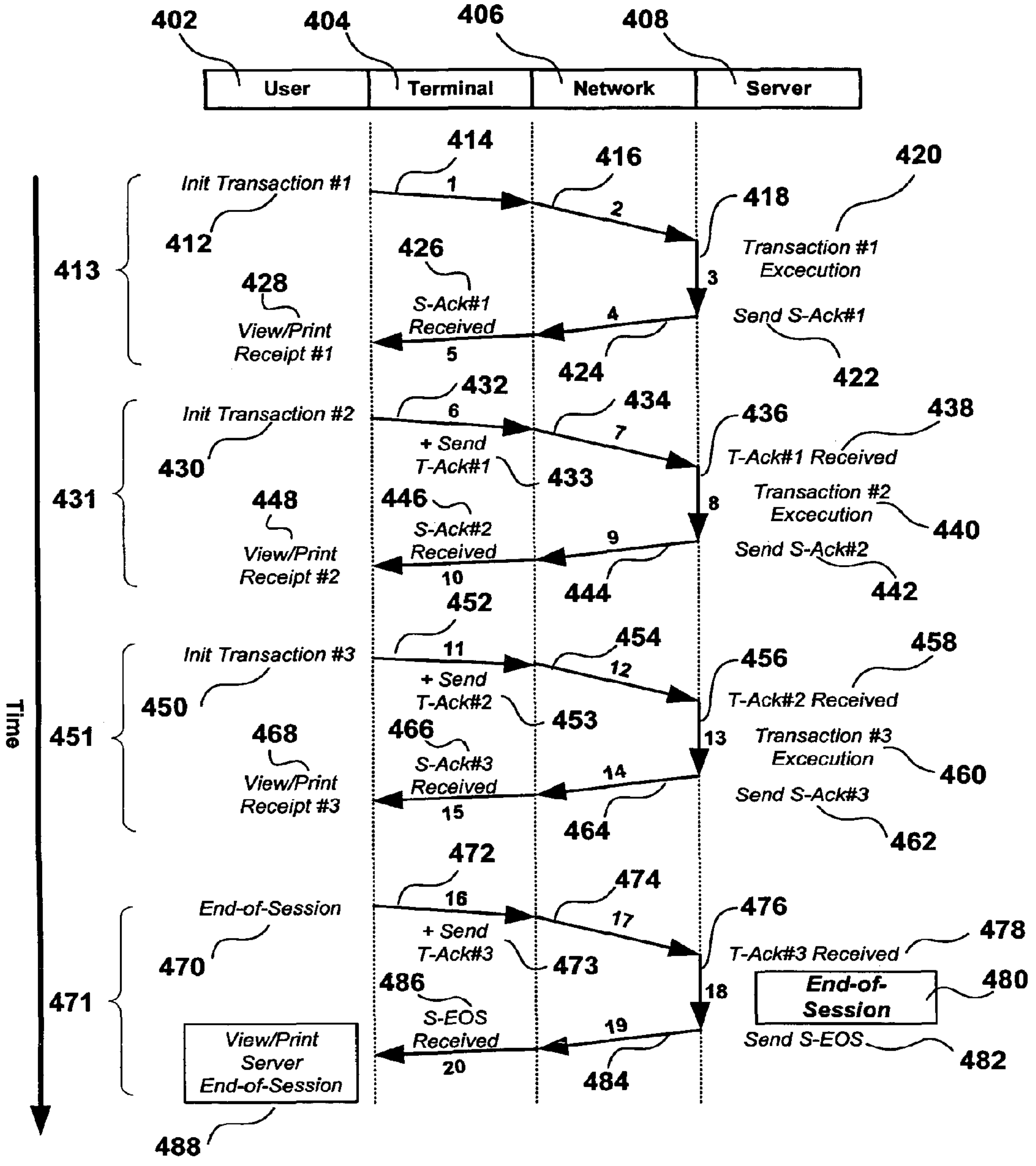
FIG. 4 shows a conventional end of transaction acknowledgment model.

FIG. 4 illustrates a proven acknowledgment model 400 used for the conventional secure online transactional business. Error recovery is not shown; however, it will be appreciated by those of skill in the art that the "retry" principles illustrated in FIG. 3 are immediately applicable. Each individual terminal transaction commit is completed when a "server acknowledgment" is received from the central server. On the other side, the server 408 needs be informed that the terminal 404 has indeed received its acknowledgment. For this, a "terminal acknowledgment" is sent to the central server 408 together with the next terminal transaction commit. A special end-of-session transaction (user generated or automatically generated) is forwarded by the terminal 404, at the end of the day for example, to resolve the ambiguity if or when the terminal 404 no longer sends normal transaction commits.

FIG. 4 shows three successive normal terminal transaction cycles (1) 413, (2) 431, (3) 451, followed by an end-of-session (4) 471 cycle. The arrow 410 indicates the passage of time.

Cycle (1) for the first transaction is exactly as described in FIG. 2. The user or an automated process initiates the transaction at 412, after which the terminal executes a process 414 concluded by the forwarding of a communication (transaction) packet 416 to the network 406. The communication packet is received by the server 408 at 418, whereupon the server 408 executes transaction #1, as shown at reference 420. The server 408 sends an acknowledgment S-Ack#1 422 through network 406, as shown at 424. The terminal 404 then receives the S-Ack#1 at 426. The "S" in S-Ack means that it is a "server" acknowledgment. The terminal 404 may then print or otherwise provide the user 402 with a receipt of the completed transaction, as shown at 428.

In cycle (2), a second transaction 430 is initiated by the user 402. The terminal 404 executes process 432 in which it assembles the transaction packet for the second transaction 430 with the addition of a terminal acknowledgment T-Ack#1 433 for the first transaction 412. The letter "T" in T-Ack means that it is a "terminal" acknowledgment. The terminal acknowledgment T-Ack#1 is simply to inform the server 408 that transaction cycle (1) did indeed complete successfully, meaning that the terminal did successfully print or display receipt#1, as shown at 448. The transaction packet for the second transaction is forwarded at 434 through the network 406 and received by the server 408, as shown at 436. T-Ack#1 is received by the server 408 at 438, and the server 408 executes transaction #2, as shown at reference 440. The server 408 send an acknowledgment S-Ack#2 442 through the network 406, as shown at 444. The terminal 404 then receives the S-Ack#2 at 446. The terminal 404 may then print or otherwise provide the user 402 with a receipt of the completed transaction, as shown at 448.

It is to be noted that a terminal acknowledgment to inform the server of the success of the previous terminal transaction is differed until the next transaction cycle. This way, we do not end up in an endless train of "acknowledging-the-acknowledge" that would rapidly jam the network. However, it will be appreciated by those of skill in the art that a predetermined timeout may be set to let the terminal return the terminal acknowledgment signal to the server after a predetermined time, in case there is a long period of user inactivity at the terminal.

In cycle (3), a third transaction 450 is initiated by the user 402. The terminal 404 executes process 452 in which it assembles the transaction packet for the third transaction 450 with the addition of a terminal acknowledgment T-Ack#2 453 for the second transaction 430. The terminal acknowledgment T-Ack#2 informs the server 408 that transaction cycle (2) did indeed complete successfully, meaning that the terminal did successfully print or display receipt#2, as shown at 448. The transaction packet for the third transaction is forwarded at 454 through the network 406, and received by the server 408 at 456. T-Ack#2 is received by the server 408 at 458, and the server 408 executes transaction #3, as shown at reference 460. The server 408 send an acknowledgment S-Ack#3 462 through the network 406, as shown at 464. The terminal 404 then receives the S-Ack#3 at 466. The terminal 404 may then print or otherwise provide the user 402 with a receipt of the completed transaction, as shown at 468.

In cycle (4), a special end-of-session transaction 470 (user generated or automatically generated) is forwarded at 472 by the terminal 404 through the network 406 as shown at 474 to the central server 408, as shown at 476. At 478, T-Ack#3 is received by the server 408, as is the end-of-session transaction, as shown at 480. The purpose of the special end-of-session transaction 470 is simply to inform the server 408 that, at the previous cycle, receipt#3 468 has been successfully printed or viewed. Upon examination of T-Ack#3 at 478, the central server 408 executes an End-Of-Session process as shown at 480 that brings to an end the acceptance of further transaction commits from the terminal at 404. The server returns an S-EOS signal at 482 through the network 406 to the terminal 404, as shown at 486. The terminal 404 then prints, displays or otherwise provides an End-Of-Session message 488 to the user 402.

Although the server will not be immediately informed that the terminal has successfully completed the printing or displaying of the End-Of-Session message 488, it will be appreciated by those of skill in the art that a terminal acknowledgment may be received at a later time, for example the next day when the user logs-in again at the terminal to commence transactional activity. In this manner, the server will clear the doubts on whether or not the terminal has successfully completed the End-Of-Session cycle the previous day.

Figure 5:
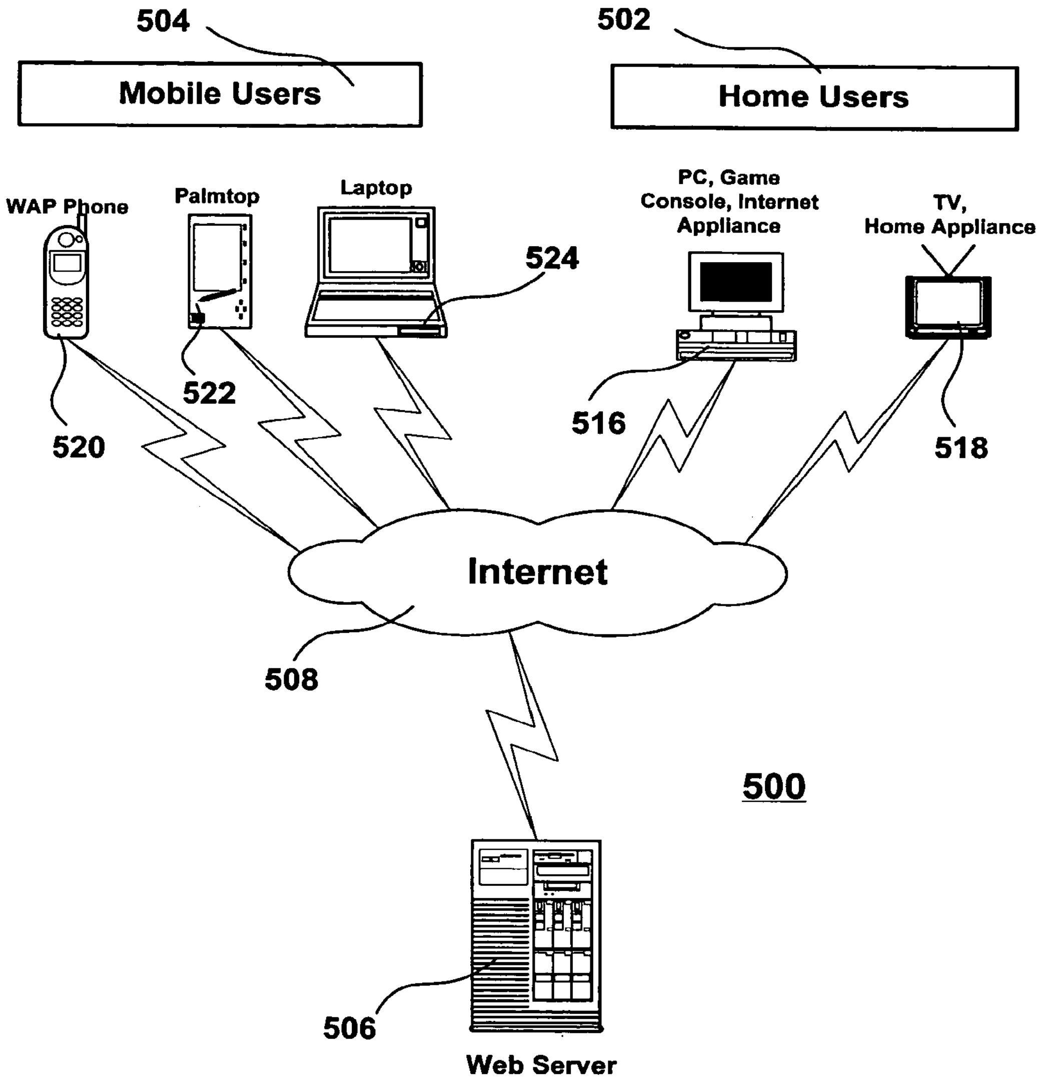
FIG. 5 shows a conventional web server topology.

FIG. 5 illustrates a conventional Internet commerce topology 500 for PC users, mobile users and home users. The web farm and relational database server are not shown for simplicity. In the case of, for example, merchant sites such as Amazon.com, a large number of home users 502 and mobile users 504 are connected to a web server 506 via the Internet 508. Home users 502 may typically make a purchase using a home PC 516 or a TV Internet appliance such as WebTV 518, for example. Mobile users 504 may make purchases via a WAP enable telephone 520, a palmtop device 522, a laptop or other mobile computer 524, for example.

These very high traffic sites rely on the pervasive three-tier model: web page server farm, clustered database server and web browser user interaction (the web farm and relational database server are not shown for simplicity). The transactional operations such as adding an item to a shopping cart and proceeding with credit card payment may take on the order of seconds to complete. During heavy traffic, the response time deteriorate rapidly. Transactional data travel via complex paths with multiple speed-optimization caches, via executing machines selected by cookie driven session state management, via imposing clusters, via hugely complex databases; consequently, zero-loss of data integrity is difficult to guarantee under all possible failure modes. Occasional loss of data integrity is not critical for an online merchant as manual procedures may be applied to resolve customers' complaints. In addition, malicious intrusion, virus contamination and distributed denial of service are a permanent threat.

Internet technologies have matured and are relatively simple to implement; solutions can be rapidly developed. Some startup companies are now attempting to apply the experience acquired in developing merchant Internet sites to gaming sites such as offshore Internet gaming sites, for example. Evidently, these gaming operations are not regulated and it is not known how these systems perform in comparison with conventional gaming systems such as online state lotteries and online casino slots. Lately, some companies have proposed offshore Internet gaming systems for use in casino and national video lotteries. Disaster tolerance with no interruption of service and zero-loss of data integrity is not even considered.

Although the use of conventional Internet server technology is tempting, it is clear that the Internet server technology is unproven. Moreover, due to the hidden complexity of Internet server technology, it is immensely difficult to reassure game regulators. In addition, gaining laboratories that test and certify gaming systems for compliance with stringent data integrity principles would need to invest considerably in educating their engineers in such technologies.

Consequently, the major drawback of such "all-Internet" topologies is the inability to support fast and trusted transactional applications that require a turn around time at server of less than 100 milliseconds and with a traffic load of tens of thousand of transactions per seconds.

Figure 6:
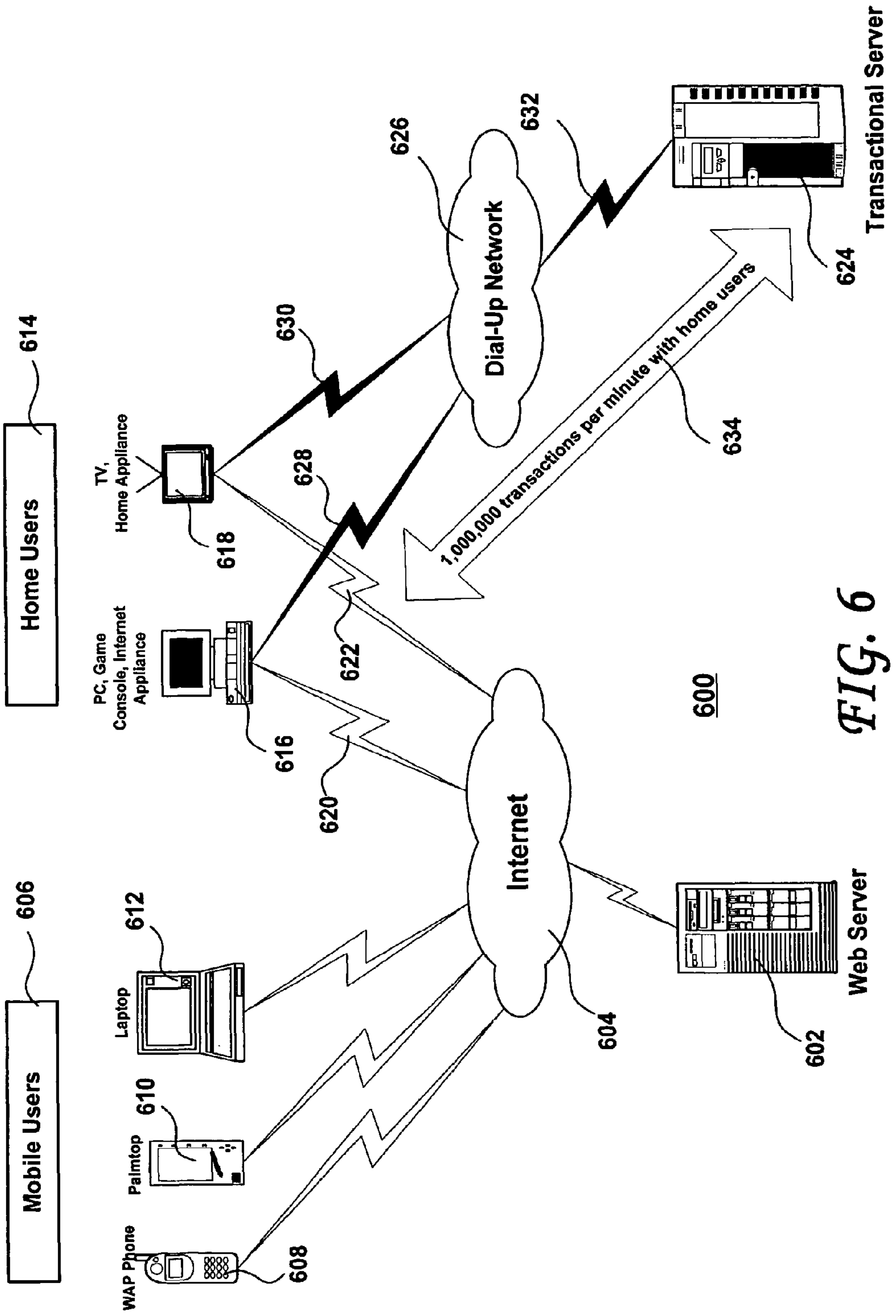
FIG. 6 shows web service with transaction captured by dialup transactional server, according to an embodiment of the invention.

FIG. 6 illustrates a topology 600 that merges Internet technology with dialup transactional techniques, according to an embodiment of the present invention. As shown, the rich content to be displayed to the users 606, 614 is handled by the web server 602 while the transactional traffic is handled via fast dialup access. The advantage of using the dialup access is that the telephone network is capable of simultaneously and reliably handling a huge number of user connections, especially if the connection time is limited to a few seconds only. Moreover, the transactional server 624 is designed in accordance with the conventional secure online transactional principles discussed above. This fast dialup approach in combination with a moderately scaled-up transactional server, may offer transactional performance of one million transactions per second, as shown at 634. This order of performance may be required when considering interactive TV applications whereby tens of millions of viewers may wish to participate in an instant voting or instant purchase while they watch an event on TV. The sluggishness of the web page update does not jeopardize the user instant voting or purchase experience. For instant purchasing, the interactive TV operator may use the 1-click model of Amazon.com, for example, whereby the user's payment means have been pre-approved.

The mobile users 606 using such devices as shown at 608, 610 and 612, the home users 614 using such devices as shown at 616 and 618 and web server 602 are connected to the Internet 604 and may operate as described relative to FIG. 5. In addition to Internet access 620, 622, home users 614 are be able to link-up to a transactional server 624 with direct dial-up 628 630, 626, 632. With such a topology, home users 614 route the transactional traffic through the dialup network to the transactional server 624 assuming a fast dialup technique holding the line for a few seconds only (fast dialup described herein below); consequently, a performance in the order of, for example, about 1 million transactions per second is easily achievable, as suggested at 634.

Figure 7:
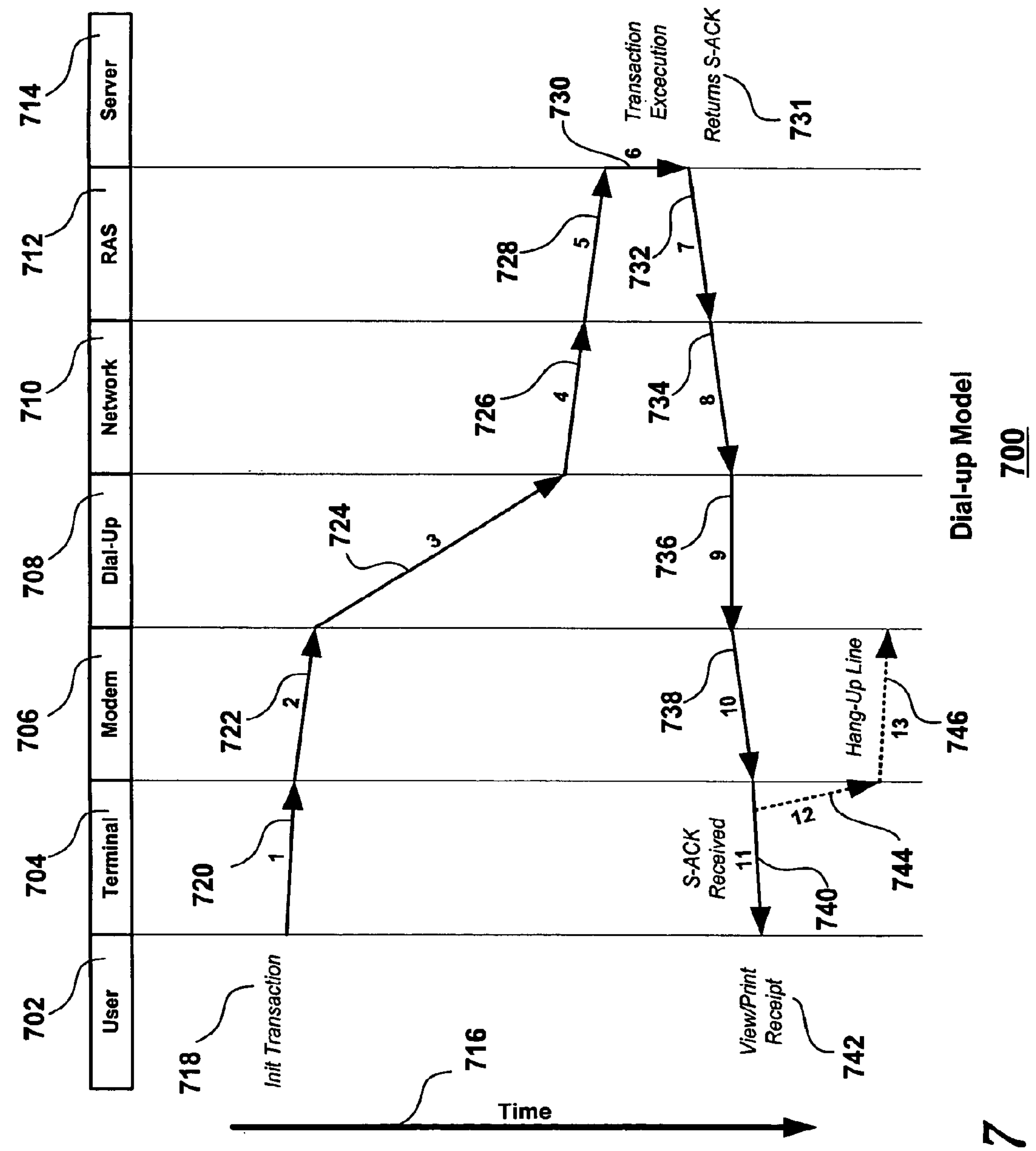
FIG. 7 shows a fast dialup transaction capture, according to an embodiment of the present invention.

FIG. 7 illustrates a model 700 for a fast dialup establishment, a transaction commit, a server acknowledge, and then the release of the line. Arrow 716 indicates the passage of time. With adequately tuned communicating equipment, a fast dialup transaction cycle may be performed in less than one second. For this, the transactional terminal 704 may be a home PC 616, a game appliance 616, an Internet appliance 616 or a TV appliance 618 that is equipped with a telephone modem 706. The central server 714 interfaces to the dialup network 708, 710 via a Remote Access Server (RAS) 712. The RAS 712 is equipped with a large number of modems capable of interfacing with the PCs' modem or TV Appliances' modem. The fast dialup transaction cycle may be carried out as follows: the user 702 initiates a transaction at 718, the terminal 704 executes the transaction initiation process at 720, and controls its modem 706 to dial-up 722 the RAS 712. Once the link is established, the terminal 704 delivers the transaction packet(s) to the network 710, as shown at 724. The packet(s) transits at 726 through the network 710 and is delivered to the RAS 712. The RAS then dispatches the packet(s) to the server 714, as shown at 728. The server 714 executes the transaction as shown at 730 and returns an acknowledgment S-ACK at 731 that is forwarded back to the terminal 704 via the path 732, 734, 736, 738 and 740. As soon as the terminal 704 has examined the server acknowledgment S-ACK, it may send a command 744 to the modem 706 to hang-up the line, as shown at 746. The transaction receipt may then be displayed or printed for the user 702, as shown at 742.

For example, the Nortel CVX 1800 Access Server and the Cisco AS5850 Access Server are each capable of holding 2688 modem connections per chassis. Four (4) Nortel CVX 1800 chassis can fit in a standard 42U rack/bay and three (3) Cisco AS5850 chassis can fit in a standard 42U rack/bay. Assuming 4 chassis per bay, 100 bays (or 400 RAS chassis, or a total of 1,075,200 dialup interfaces) and a fast dialup time of 1 second, a total of approximately 1,000,000 transactions can be made every second. These bays may be geographically distributed in order to balance the traffic produced by the geographically dispersed TV viewers or users. This amount of equipment is not unreasonable to achieve such high transactional performance. In comparison, the Google™ search engine relies on over 15,000 servers or 180 bays (80 hundred servers per bay) in order to provide an under 1 second "Read-Only" service at a maximum of 1,000 queries per second.

Moreover, Nortel CVX 1800, Cisco AS5850 or equivalent remote access equipment are universally used by all telecom providers. This remote access equipment may communicate with a central transactional server via high-speed links. Consequently, a very large-scale fast dialup transactional capture system may be implemented in a relatively straightforward manner.

Figure 8:
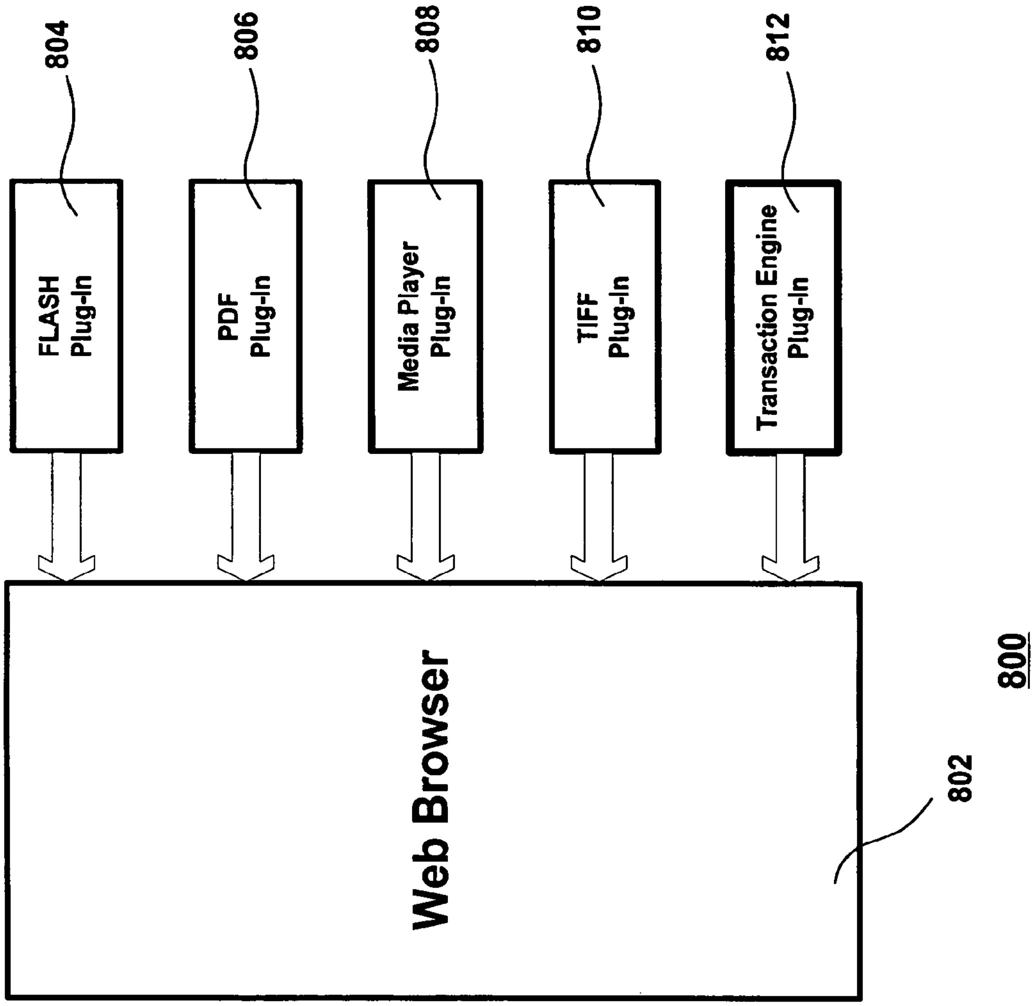
FIG. 8 shows a web browser transaction engine plug-in, according to an embodiment of the present invention.

FIG. 8 illustrates the transactional engine plug-in 800 that supports the transactional traffic between the user web browser session and the central transactional server. Browser plug-ins are custom developed applications that obey a predefined web browser Application Program Interface (API) to make specific services available when the user interacts with the web browser 802. Examples of commonly available plug-ins include the Flash player 804 from Macromedia, the Acrobat PDF reader 806 from Adobe, the media player plug-in from Microsoft 808, the AltemaTIFF plug-in 810 from Medical Informatics Engineering allowing, for example, viewing of USPTO patent pages provided in the TIFF format. These plug-ins are usually downloaded when the user navigates on the Internet using the web browser 802. For security reasons, the user is usually asked to authorize or deny the download and installation of such plug-in. Code signing or authenticode technology may be used to identify the software provider.

The transaction engine plug-in 812 is an object of this invention in that it allows carrying out fast dialup transaction cycles independently of the web server that is serving the web browser pages. When the user presses the submit button in his browser, the transaction engine plug-in 812 takes over the processing. Later in this document, another exemplary implementation of the transaction engine plug-in 812 will be described, which makes use of UDP protocol to perform the transaction cycle.

Figure 9:
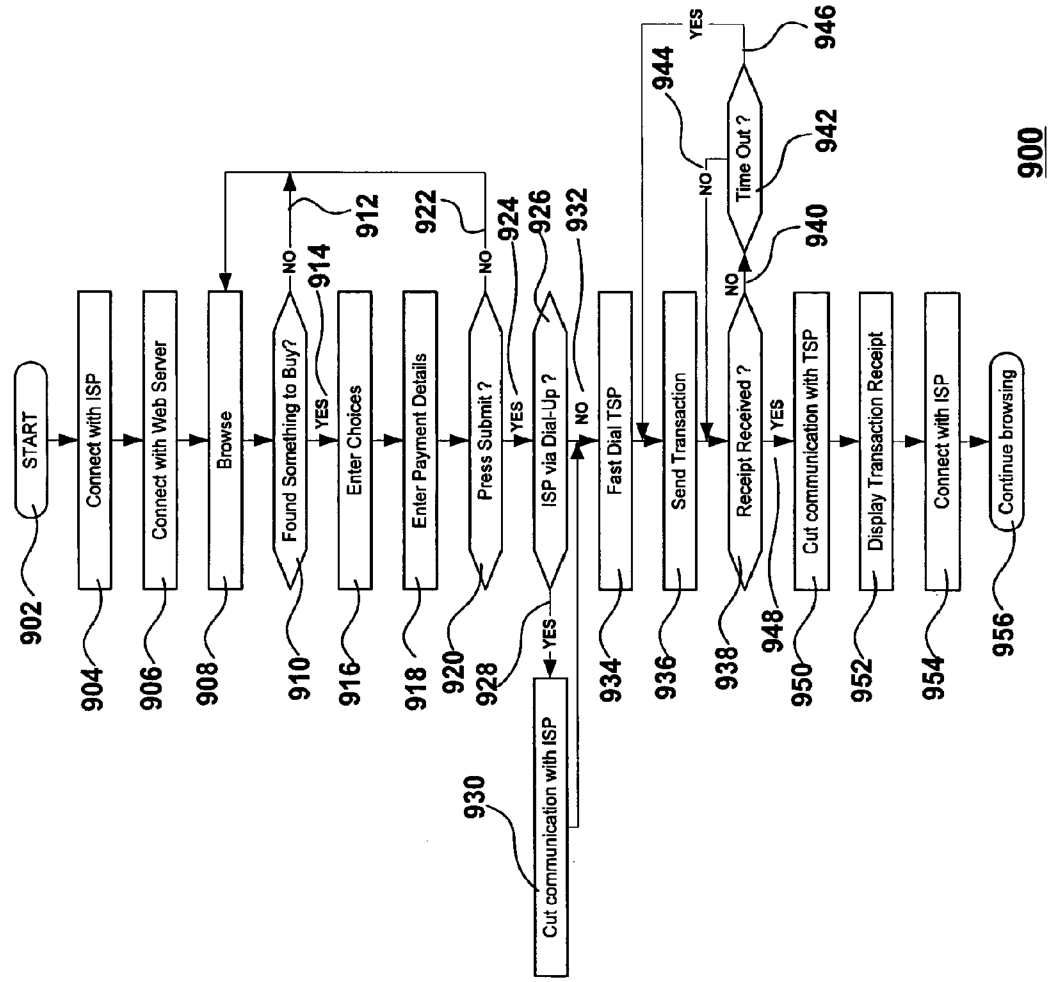
FIG. 9 shows web service with transactions committed by dialup, according to an embodiment of the present invention.

FIG. 9 is a flowchart 900 illustrating a transaction commit via dialup while the user is engaged in a web browser session. It is to be noted that if the user Internet link is already used by the web browser session (user telephone line), this link may be cut to enable fast dialup access directly to the central transactional server and transaction commit. When the transaction is completed, which may only take a few seconds, the Internet link may be re-established with the original web browser session.

Hereafter is an example of a transaction commit via dialup whereby a user makes a purchase. It is assumed that the user's PC or TV appliance (thereafter the terminal) is equipped with a dialup modem connected to the telephone line. The purchase may be, for example, an item to be delivered, a service or a vote. The flowchart begins at 902. Typically, a user engages into a web browser session at 908 after connection to an ISP (Internet Service Provider) at 904 and connection to a web server at 906. Should the user find something of interest to purchase as suggested by the YES branch 914 at 910, the user may enter his or her choices 916, enter the payment details (could be a 1-click model) at 918 and then press the submit button 920, as suggested by YES branch 924. If the user has not decided to purchase anything (or enter a vote, for example), he or she may continue to browse, as shown at 912. If the user does not press the submit button at 920, as suggested by the NO branch 922, the user may continue to browse and may be returned to 908.

If it is determined at 926 that the connection to the ISP is via the modem 928 (that is, not thought xDSL or cable modem), the transaction engine plug-in 812 may cut the communication with the ISP by hanging-up the line at 930, as shown by YES branch 928. If it is determined that the connection to the ISP is via a broadband connection (e.g., xDSL or cable modem), the NO branch 932 is taken and the terminal initiates a fast dialup at 934 to connect to the transactional server 714 (or TSP Transaction Service Provider). Once the link is established, the terminal sends the transaction packet(s), as shown at 936. Upon acknowledgement from the server at 938, the terminal may proceed through YES branch 948 and cut the communication with the transaction service provider (TSP) at 950 by hanging the telephone line and may then print or display a transaction receipt 952. Should an acknowledgement from the server not be received at 940 after a time-out 946 (NO branch 940), the terminal will return to step 938 (NO branch 944 until the expiration of a predetermined time out 942. When the time out 942 elapses (YES branch 946), the terminal may return to step 936 to retry sending the transaction. Finally, the transaction engine plug-in 812 re-establishes connection with the ISP at 954 (if link was cut at 930) and relinquishes control to the web browser, as shown at 956.

Figure 10:
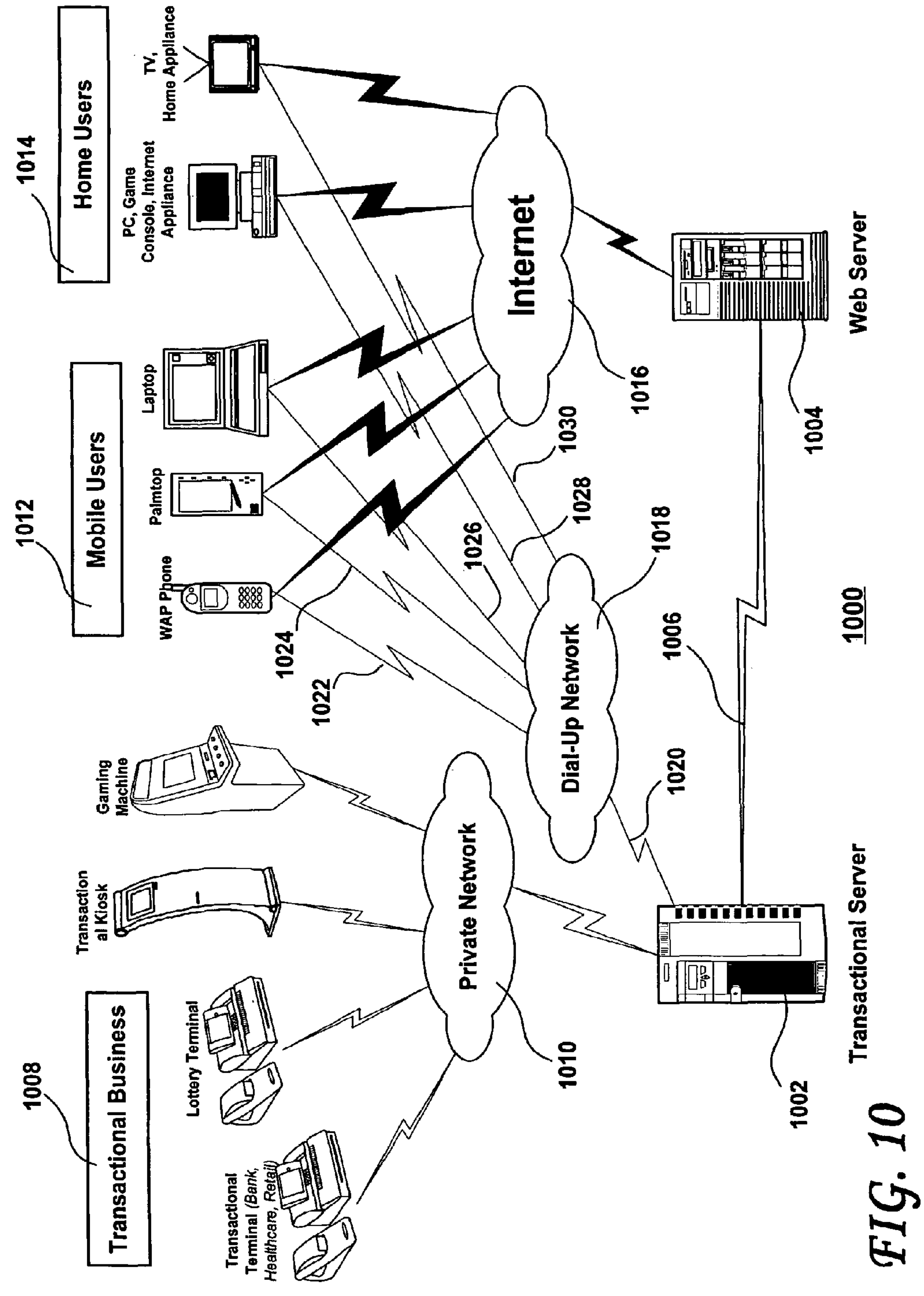
FIG. 10 shows the merging of web services and transactional services, according to an embodiment of the present invention.

FIG. 10 illustrates a model 1000 that merges of web services and secure online transactional services, according to an embodiment of the present invention. Transaction services offered by the transactional server 1002 for conventional transactional business users 1008 is via private network 1010 while transaction services for mobile 1012 and home users 1014 is via fast dial-up 1022, 1024, 1026, 1028, 1030, 1018, and 1020. Web page services are provided for mobile 1012 and home users 1014 via the Internet 1016 and the web server 1004. The web server 1004 and the transactional server 1002 are synchronized via a fast dedicated link 1006.

Figure 11:
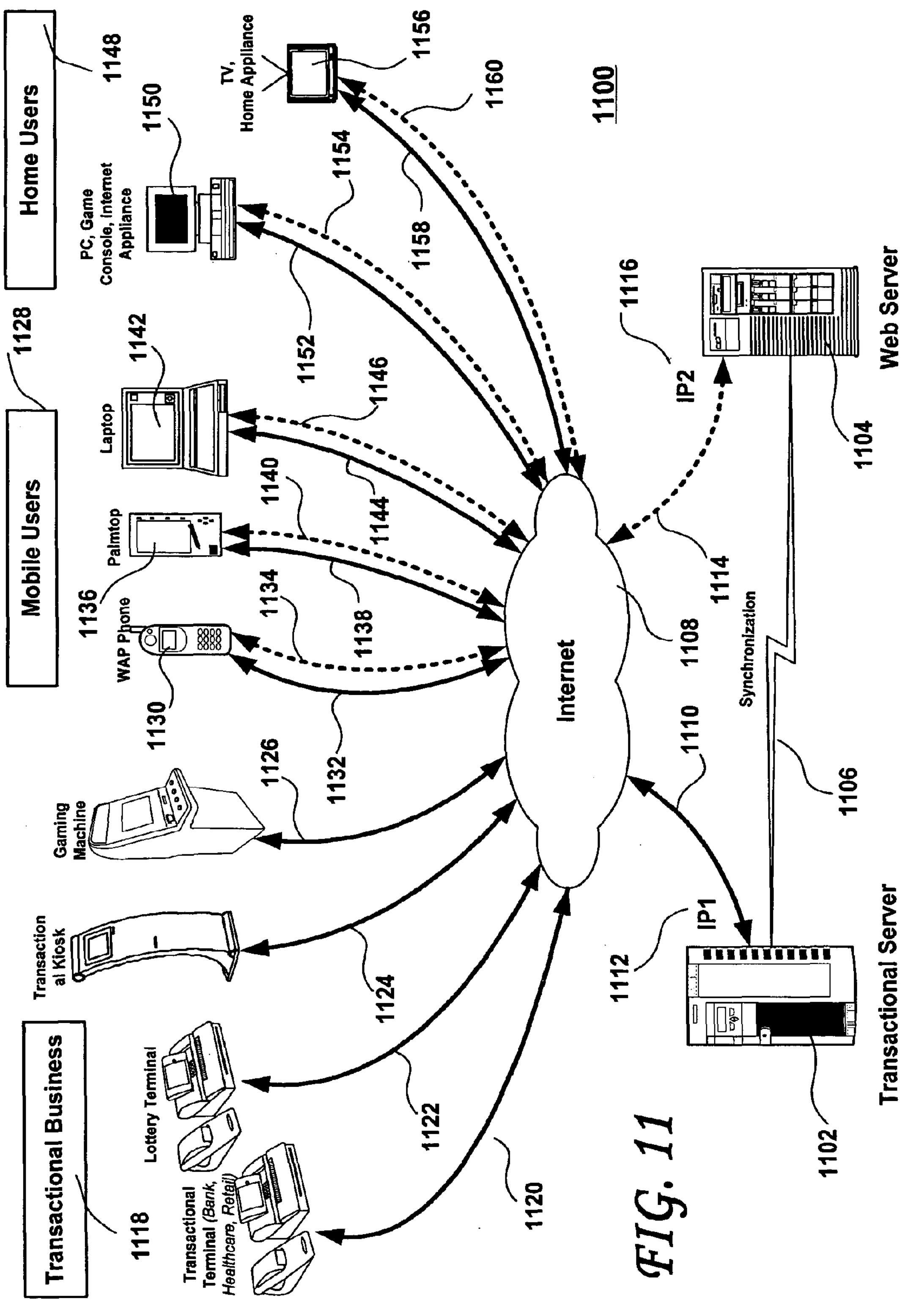
FIG. 11 shows the merging of web services and Internet routed transactional services, according to an embodiment of the present invention.

FIG. 11 illustrates a model 1100 for the merging of web services and Internet routed transactional services, according to an embodiment of the present invention. Transactional services (the solid links 1120, 1122, 1124, 1126) for transactional business users 1118 and transaction services (the solid links 1132, 1138,1144, 1152, 1158) for mobile 1128 and home 1148 users are via a transaction tunnel through the Internet 1108. Transactional server 1102 is at IP address IP1, referenced at 1112. Rich web page content updates for mobile 1128 and home 1148 users may be carried out via conventional TCP/IP and HTTP protocols, for example (as indicated by the dotted links 1134 1140 1146 1154 1160 1114) controlled by the web server 1104 at IP address IP2, referenced at 1116.

The transactional tunnel referred to above may be as described in commonly assigned Large Scale Controlled and Secure Data Downloading—Application Ser. No. 60/332,522 and PCT/US02/37529 filed Nov. 22, 2002. The transaction tunnel may use the UDP protocol. The transaction tunnel may also be a secure tunnel such as VPN or IPSec. The web server and the transactional server may be synchronized via a fast dedicated link 1106.

Figure 12:
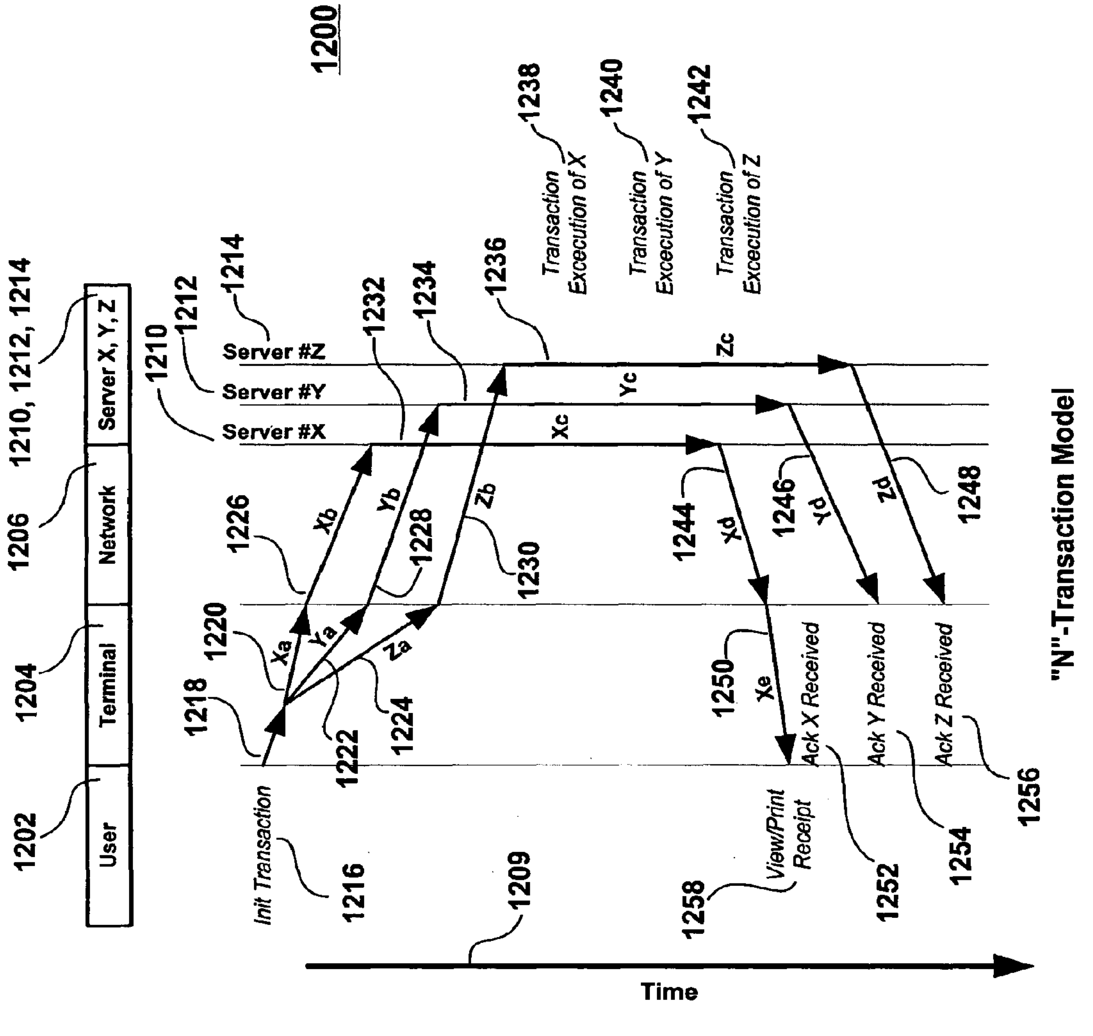
FIG. 12 shows an "n"-transaction model—nominal mode, according to an embodiment of the present invention.

FIG. 12 shows an "N"-Transaction Model 1200—Nominal Mode, according to an embodiment of the present invention. As show therein, a terminal 1204 commits simultaneously a transaction to several geographically spaced central servers. For simplicity, the diagram shows the exemplary case for 3-servers/3-transactions. Error recovery (retry model) is not shown in case of a failure anywhere outside the terminal boundary. However, it will be appreciated by those of skill in the art that extension to N-servers/N-transactions is straightforward subsequent to examining the diagram and the associated detailed description. In the same manner, implementing the "One" transaction model depicted in FIG. 2, the Retry model depicted in FIG. 3 and the Acknowledgment model shown in FIG. 4 is also straightforward.

The transaction cycle may proceed as follows. Arrow 1209 indicates the passage of time. Upon a user 1202 initializing a transaction 1216, the terminal 1204 executes the process 1218 to prepare a transactional packet and duplicates the prepared transactional packet into 3 separate packets Xa 1220, Ya 1222 and Za 1224. The Xa packet is destined for server X 1210, Ya is destined for Server Y 1212 and packet Za is destined for server Z 1214. As a whole, the three packets are identical except for the destination address and for the forwarding of previous acknowledge signals to/from the servers. Each of the three transaction packets Xb 1226, Yb 1228 and Zb 1230 travels through the network 1206 and is delivered as inbound packet to the respective servers X 1210, Y 1212 and Z 1214. Each server receives the inbound packets at 1232, 1234 and 1236. After examination of the inbound packet for integrity and correctness of the originating terminal source address, each server executes the same transaction on the received inbound packets at 1238, 1240, 1242 and upon completion, returns an outbound packet Xd 1244, Yd 1246 and Zd 1248 each destined to the originating terminal 1204.

The receipt is printed (or viewed) at 1258 immediately upon receiving an acknowledgement from any one of the three servers. Upon receiving a first outbound packet (containing a server acknowledgment) from one of the three server X, Y or Z (Xe 1250 in this diagram), containing acknowledgment of server X at 1252, the terminal 1204 views or print a receipt 1258. The terminal may also take note of the arrival of the acknowledgments 1254 and 1256 from servers Y and Z.

Figure 13:
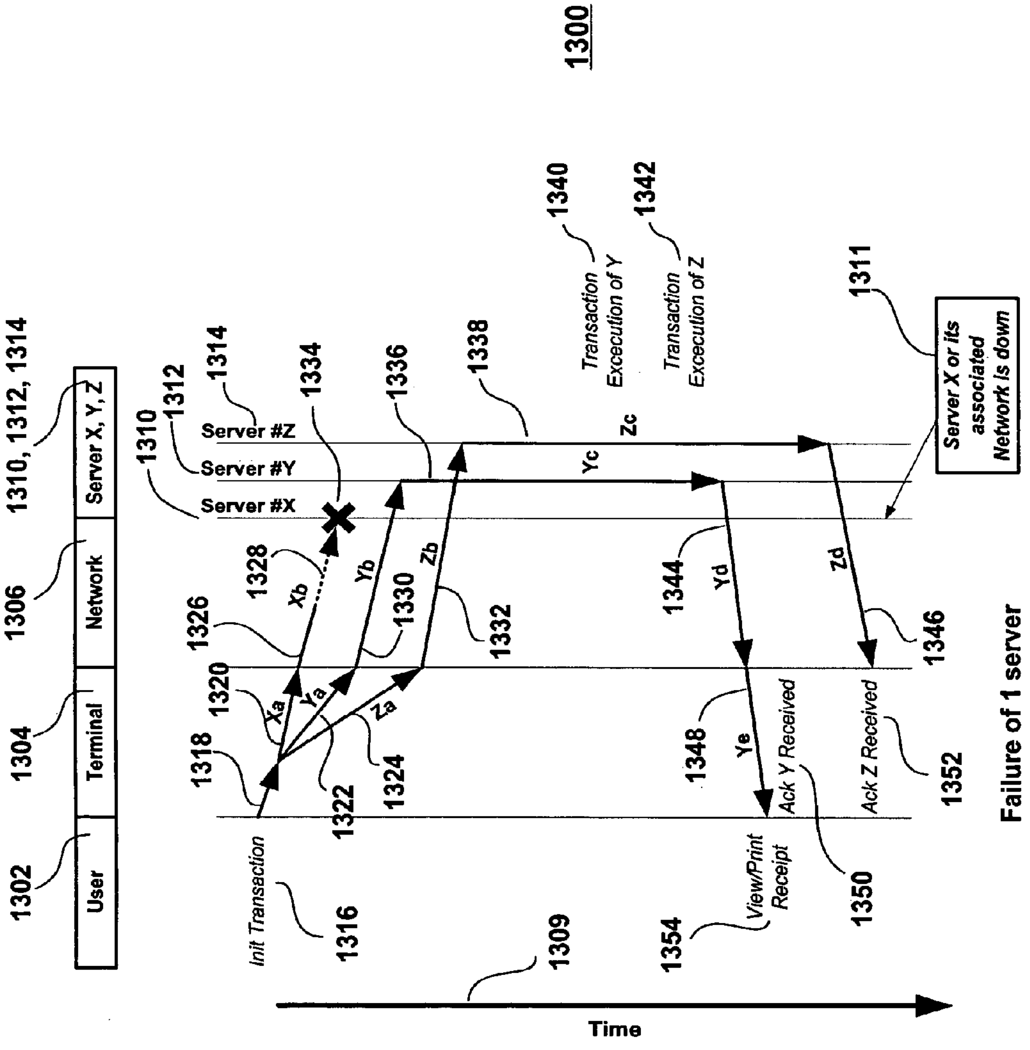
FIG. 13 shows an "n"-transaction model—failure of one server, according to an embodiment of the present invention.

FIG. 13 illustrates at 1300 the case wherein one of the paths between the terminals and the servers experiences a failure and shows that such failure does not have an impact upon the transaction cycle. The unsuccessful arrival after a predetermined time-out of an acknowledgment from the X server is simply noted in a failure log by the terminal re-synchronization application. Arrow 1309 represents the passage of time.

The transaction cycle is identical to that described relative to FIG. 12, except that in the illustrative transaction of FIG. 13, the terminal transaction packet Xb 1326 never reaches server X 1310. Upon a user 1302 initializing a transaction 1316, the terminal 1304 executes the process 1318 to prepare a transactional packet and duplicates the prepared transactional packet into three separate packets Xa 1320, Ya 1322 and Za 1324. The Xa packet is destined for server X 1310, Ya is destined for server Y 1312 and packet Za is destined for server Z 1314. Overall, the three packets are identical except for the destination address and for the forwarding of previous acknowledge signals to/from the servers.

In FIG. 13, either the packet Xb got lost as suggested at 1328 during its transit via the network 1306 or the server X is unavailable as shown at 1334. The exact location of or the reason for the failure 1311 is unimportant. The two inbound packets Yb 1330 and Zb 1332 are received by the servers Y and Z at 1336 and 1338. Transactions on the received inbound packets are then carried out at 1340, 1342 by the two servers Y and Z, and outbound packets Yd 1344 and Zd 1346 are returned to the terminal 1304.

The receipt is printed (or viewed) at 1354 immediately upon receiving an acknowledgement from any one of the two operational servers Y or Z. Upon receiving a first outbound packet (containing a server acknowledgment) from one of the two server Y or Z (Ye at 1348 in this diagram), containing acknowledgment from server Y at 1350, the terminal 1304 views or print a receipt at 1354. The terminal 1304 takes note of the arrival of acknowledgment 1352 from server Z, and after a predetermined timeout, takes note that no acknowledgment has been received from server X 1310 for the current transaction cycle and that server X may not have received the transactional packet Xb sent by the terminal 1304. The terminal may simply keep a log of the identifier for the missing transaction acknowledgment. That the server X may not have received the transactional packet sent by the terminal and thus may lack data will be remedied in a synchronization operation at a later stage.

Consequently, in the above-described transaction cycle, the failure to communicate with one of the three servers has no impact for a user carrying out a normal transaction operation. The terminal is an active participant in the resynchronization subsequent to a failure in a transactional path.

It will be also appreciated by those of skill in the art that the illustrated transaction processing may readily be extended to N-servers/N-transactions. In the same manner, implementing the "One" transaction model depicted in FIG. 2, the Retry model depicted in FIG. 3 and the Acknowledgment model depicted in FIG. 4 is also straightforward.

This N-servers/N-transactions model whereby servers are separated by a significant distance has the advantage of providing extreme resilience for non-stop disaster tolerance.

Figure 14:
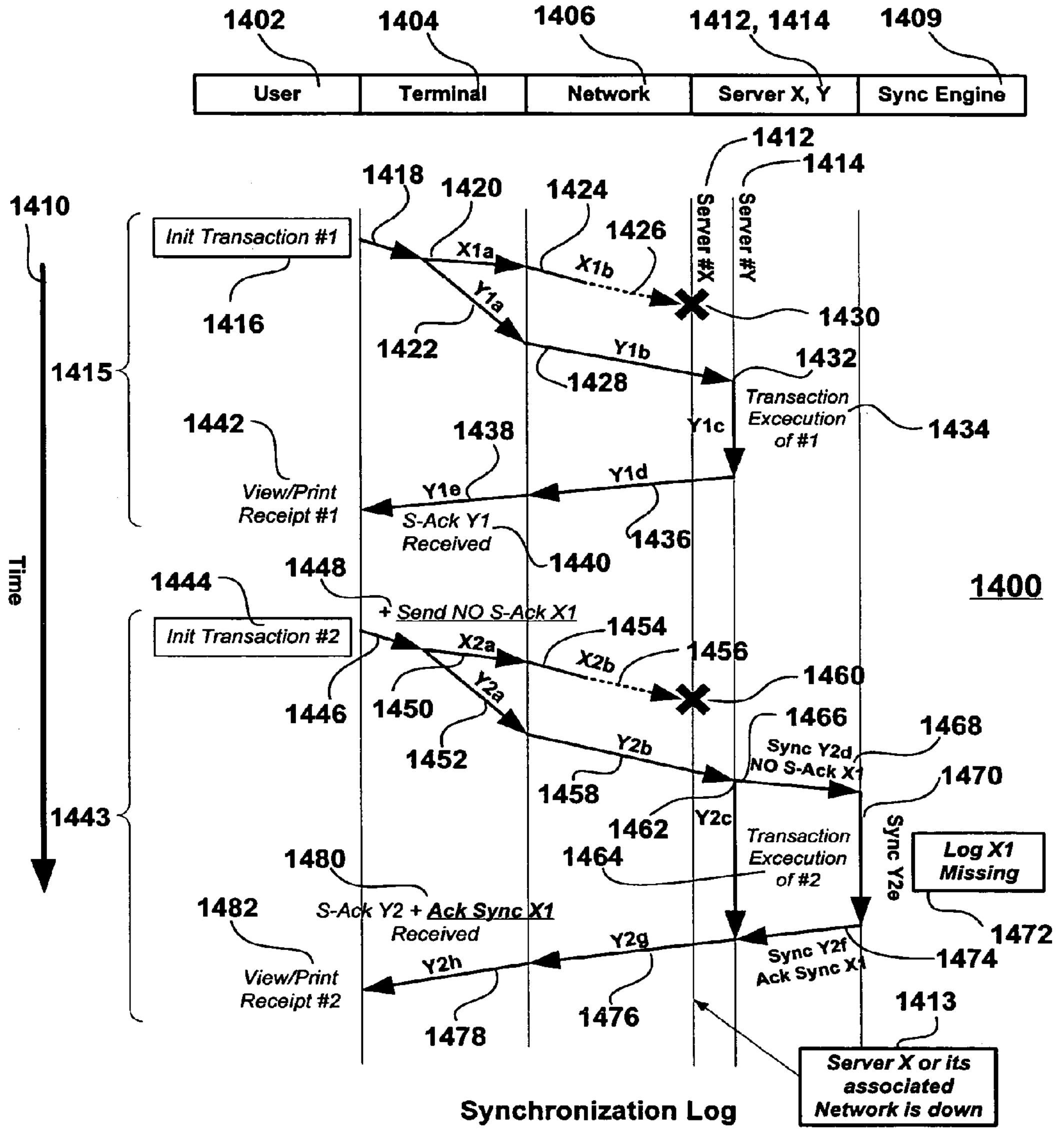
FIG. 14 shows an "n"-transaction model—synchronization log, according to an embodiment of the present invention.

FIG. 14 illustrates at 1400 the construction of a synchronization log by an operational server in the case of failure of another server or failure of its network path with the terminals. For simplicity, the diagram of FIG. 14 shows the case for two-servers/two-transactions. Error recovery (retry model) is not shown in case of a failure anywhere outside the terminal boundary. Arrow 1410 indicates the passage of time.

Transaction cycle (1) 1415 is identical to the transaction cycle illustrated in FIG. 13, apart from the fact that only a two-transaction model is shown and server Z together with its associated data path to and from the terminal is ignored. Upon a user 1402 initializing a transaction 1416, the terminal 1404 executes the process 1418 to prepare a transactional packet and at duplicates the prepared transactional packet into two separate packets X1*a* at 1420 and Y1*a* at 1422. The X1*a* packet is destined for server X 1412 and Y1*a* is destined for server Y 1414. Overall, the two packets are identical except for the destination address and for the forwarding of previous acknowledge signals to/from the servers.

In FIG. 14, either the packet X1*b* 1424 got lost as suggested at 1426 during its transit via the network 1406 or the server X is unavailable as shown at 1430. The exact location of or the reason for the failure 1426 is unimportant. The inbound packet Y1*b* 1428 is received by the server Y at 1432. A transaction on the received inbound packet is then carried out by server Y at 1432 and an outbound packet Y1*d* 1436 is returned to the terminal 1404. Upon receiving outbound packet (containing a server acknowledgment) Y1*e* at 1438 from server Y, the terminal 1404 views or print a receipt at 1442.

The terminal 1404 has-taken note of the arrival of acknowledgment S-ACK Y1 1440 from server Y, and after a predetermined timeout, takes note that no acknowledgment has been received from server X for the transaction cycle (1) and that in consequence, server X may be lacking the transactional packet for cycle (1) sent by the terminal 1404.

In transaction cycle (2) 1443, user 1402 initializes transaction #2 at 1444 and the terminal 1404 executes the process 1446 to prepare a transactional packet and at 1446 duplicates the prepared transactional packet into two separate packets X2*a* at 1450 and Y2*a* at 1452. The X2*a* packet is destined for server X 1412 and packet Y2*a* is destined for server Y 1414. Overall, the two packets are identical except for the destination address and for the forwarding of previous acknowledge signals to/from the servers. As shown in FIG. 14, a NO S-ACK X1 (information to the effect that no Acknowledgment from server X was received in previous transaction cycle) is added to the transaction packet 1446, as shown at 1448.

In FIG. 14, either the packet X2*b* 1454 got lost as suggested at 1456 during its transit through the network 1406 or the server X is still unavailable, as shown at 1413. The exact location of or the reason for the failure 1456 is unimportant. The inbound packet Y2*b* 1458 is received by the server Y at 1462. A transaction on the received inbound packet Y2*c* is then carried out by server Y at 1464. Upon receipt and examination of the received inbound packet at 1462 by server Y 1414, the SYNC Y2*d* and NO S-ACK X1 1468 information is forwarded at 1466 to the synchronization engine 1409 Y 1415 located at server Y, is received by the synchronization engine 1409 at 1470. The synchronization engine of server Y 1415 keeps a log of the identifiers of all the missing transactions that were not received by server X 1412, as shown at 1472 and then generates an acknowledgment signal SYNC Y2*f* ACK SYNC X1 1474 to confirm that the logging has been successful and sends the acknowledgment back to the terminal 1404 through the network 1406, as shown at 1476. The terminal 1404 received the acknowledgment at 1478, including the SYNC Y2*f* ACK SYNC X1 information at 1480. Resynchronization of the data-lacking server X 1412 is discussed below. A receipt may then be provided to the user 1402, as shown at 1482.

It will be also appreciated by those of skill in the art that extending the model detailed herein relative to FIG. 14 to N-servers/N-transactions is straightforward. In the same manner, the "One" transaction model depicted in FIG. 2, the Retry model depicted in FIG. 3 and the Acknowledgment model depicted in FIG. 4 may also be readily implemented. Such an N-servers/N-transactions model whereby servers are separated by a significant distance has the advantage of providing extreme resilience for non-stop disaster tolerance.

Figure 15:
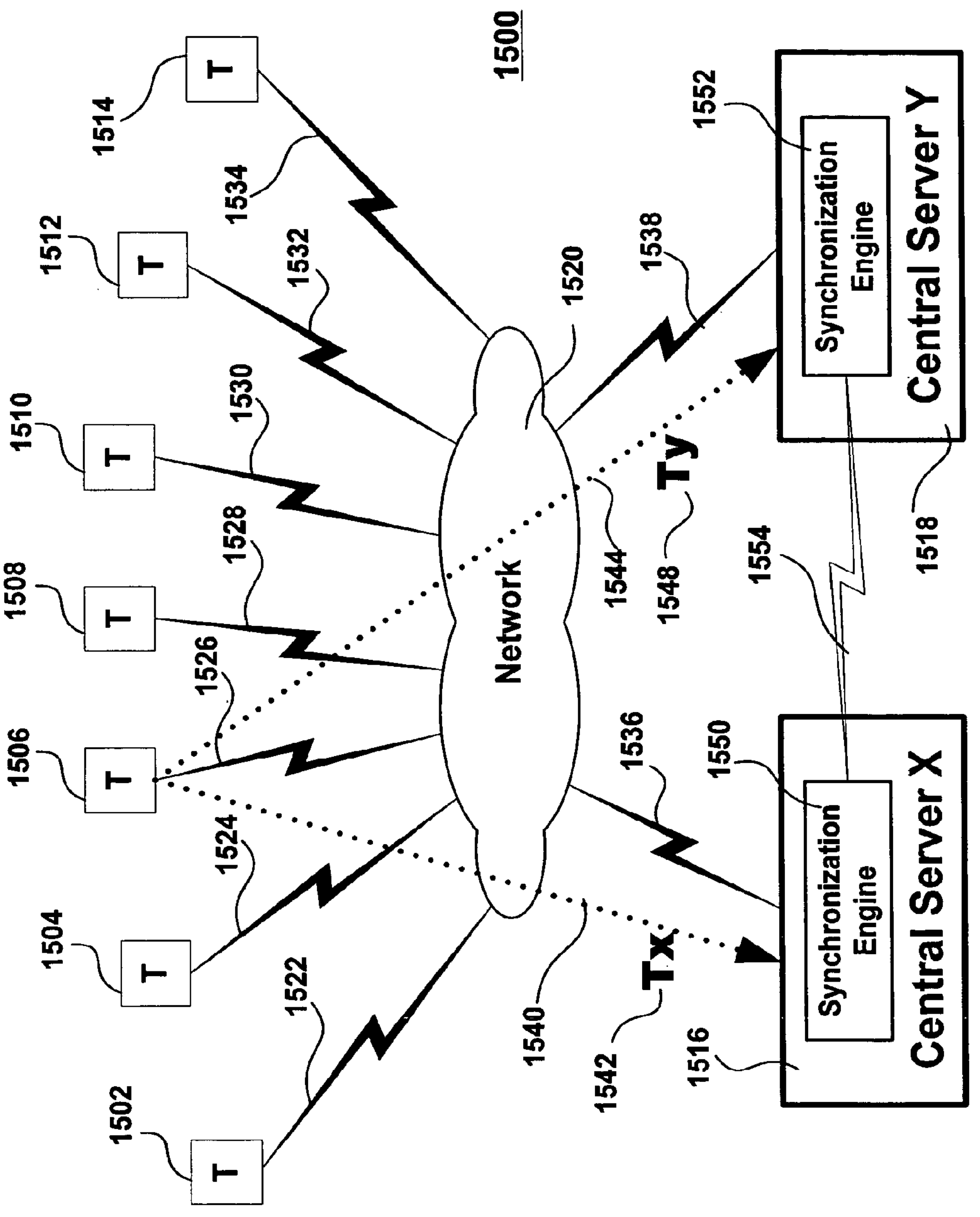
FIG. 15 shows a "2" transaction model—server and network server topology, according to an embodiment of the present invention.

FIG. 15 illustrates at 1500 the manner in which how two transactions may be committed to two geographically dispersed servers, and how the two central servers may be resynchronized following a failure in the transaction path. The synchronization engines use the synchronization log established by the terminal that noted the missing server acknowledgments. As shown therein, terminals 1502, 1504, 1506, 1508, 1510, 1512 and 1514 are coupled to the network 1520 via communication paths 1522, 1524, 1526, 1528, 1530, 1532 and 1534, respectively. The communication paths from the network 1520 to the server X 1516 and to the server Y 1518 are shown at 1536 and 1538, respectively.

FIG. 15 shows the N-transaction cycle as expressed in FIGS. 12, 13 and 14 from a different perspective. In the case of a two-servers/two-transactions model, a terminal 1506 may forward a transaction packet Tx 1542 to the central server X 1516 via the network path 1540 that transits through the (e.g., Internet) network path 1526 1520 1536, as a UDP (User Datagram Protocol, a transport layer protocol optimized for small data packets and used by real time applications) packet, for example. In the same manner, the terminal 1506 may forward a transaction packet Ty 1548 to central server Y 1518 via the network path 1544 that transits through the network 1526, 1520, 1538, as a UDP packet, for example.

Synchronization engine 1550 located at server X 1516 and synchronization engine 1552 located at server Y 1518 may communicate with one another via a synchronization link 1554, or alternatively, via another predetermined network connection. Whenever one of the synchronization engines starts building a synchronization log as a result of a terminal notification to do so, for example as shown in FIG. 14 in which server X is unreachable by the terminal 1404, server Y contacts server X through the synchronization link 1554. If server X is operational, server Y forwards all the transactional information from the terminal that server X has not received because of failure. As a result, server X now contains the same terminal transactional data as server Y. On the other hand, if server X is still not operational, server Y 1518 keeps retrying until the resynchronization of server X 1516 is completed. Once the resynchronization is completed, the overall system resilience is returned to its nominal availability, and any of the servers or associated link with the terminal may fail without causing any interruption of service at the terminal. It will be appreciated by those of skill in the art that the topology shown in FIG. 15 may readily be extended to the N-servers/N-transactions case.

Figure 16:
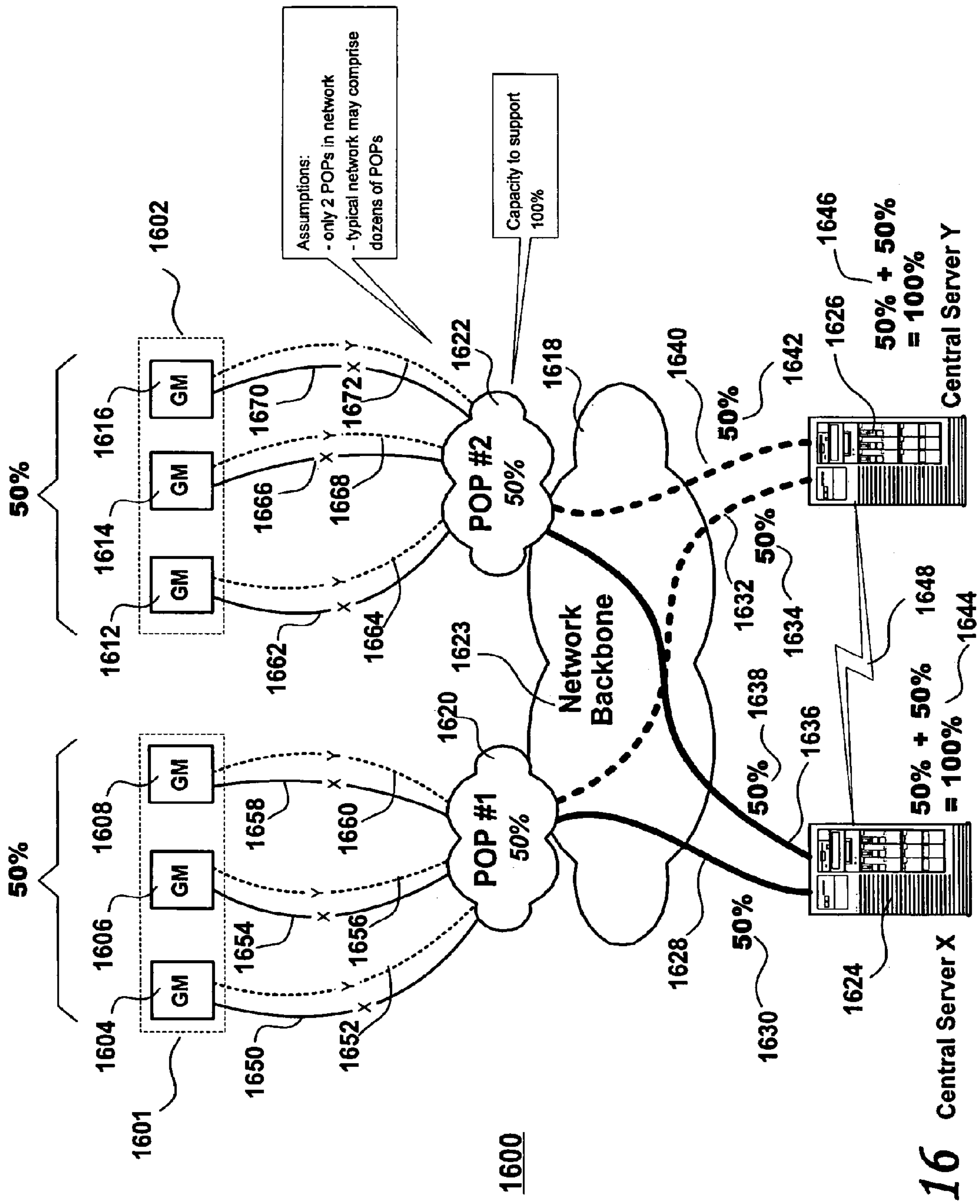
FIG. 16 shows a "2" transaction model—distributed load replication, according to an embodiment of the present invention.
Figure 17:
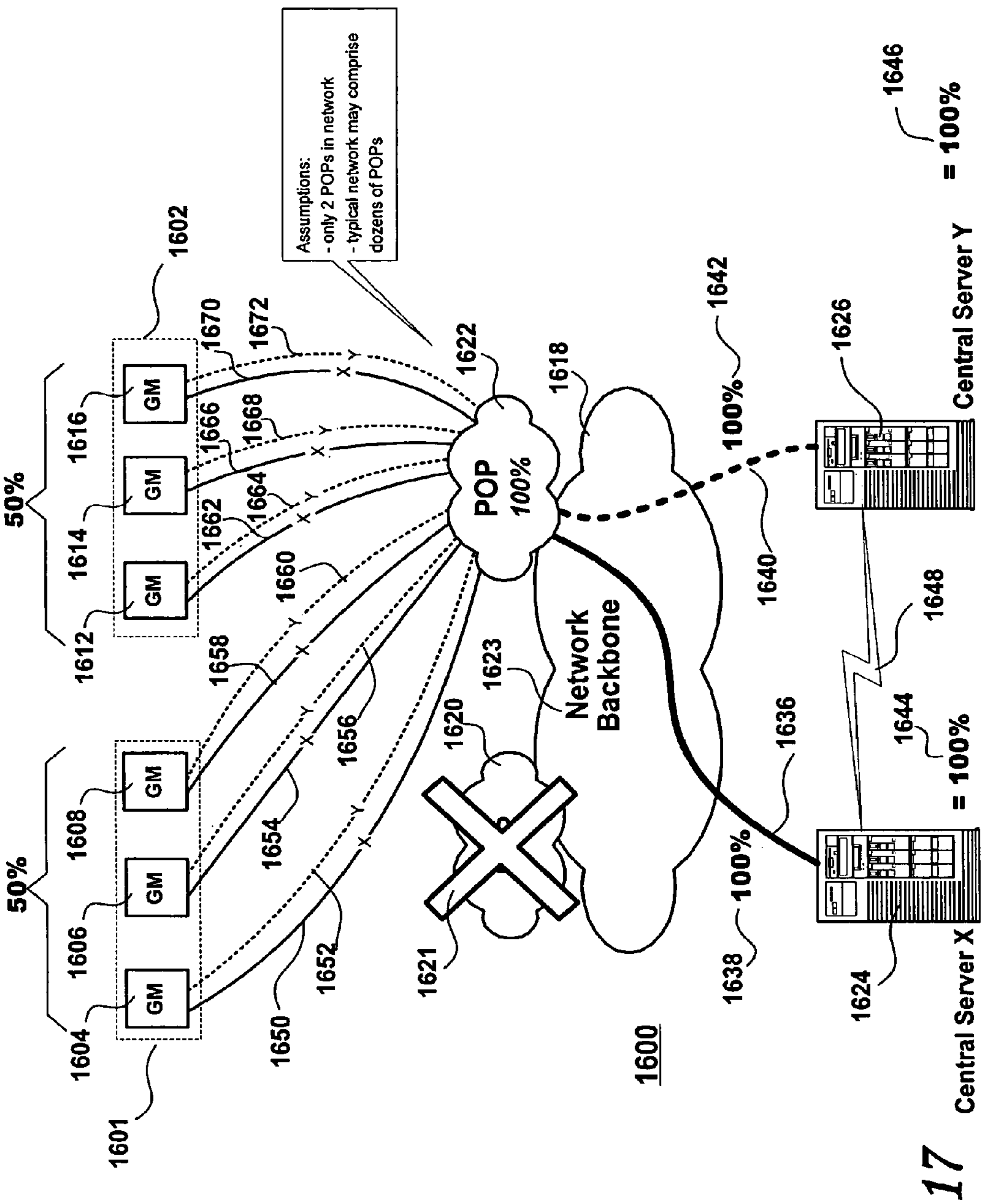
FIG. 17 shows a "2" transaction model—load failover, according to an embodiment of the present invention.

FIG. 16 illustrates load replication at 1600 in the case of a two-transaction model and two-POPs (Point Of Presence). Depending on the wide area communications means made available by the network or Internet service provider, a preferred network topology such as depicted in diagram 1600 may be proposed such as to offer excellent resilience in case of a severe failure of part of the network while all the servers are kept in reach of the terminals. FIG. 16 illustrates the case wherein there is no failure. FIG. 17 illustrates what happens when the network behind a POP is inoperative.

Figure 21:
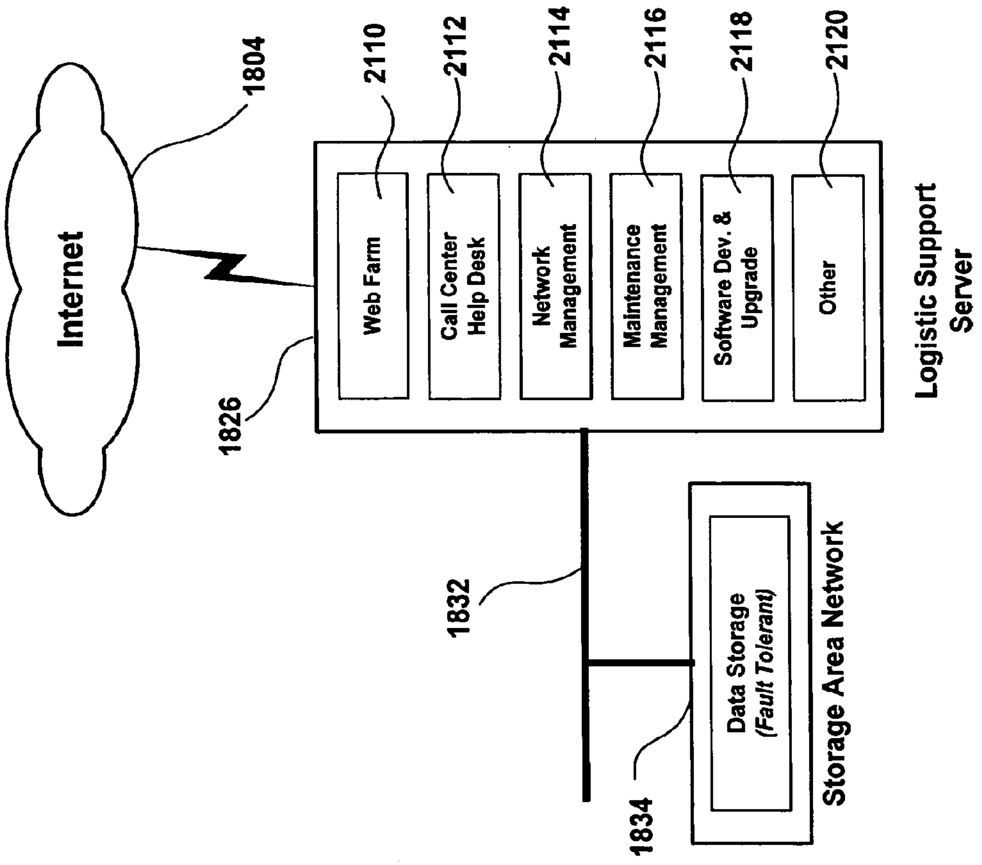
FIG. 21 shows a logistic support overview, according to embodiment of the present invention.

Thanks to the N-transaction model, each terminal may be configured to send a duplicate transaction commit to any central server in accordance with a destination address determined by a network management unit (for example 2114 in FIG. 21). In addition, the terminal may be given a predetermined POP (Point Of Presence) to connect to in order to access the network. As instructed by the network management unit, the terminal may, for load balancing reason or because of network failure, connect to another POP at any time. POPs usually connect to a network backbone such as the Internet backbone. The central servers may connect directly to the backbone or via a POP or a plurality of POPs.

In the following detailed description of exemplary embodiments of the invention, reference is made to FIG. 16, in which specific exemplary embodiments are shown. The network management unit has configured the network segment #1 1601 such that 50% of the terminals 1604, 1606, 1608, 1612, 1614 and 1616 are connected to POP #1 1620 and has configured the network segment #2 1611 the other 50% of terminals (which may be or include gaming machines (GM), for example) 1604, 1606, 1608, 1612, 1614 and 1616 to POP #2 1622. To give an order of magnitude, consider a total number of 100,000 terminals geographically distributed over a large state such as Texas. Therefore, each POP handles the traffic coming from 50,000 terminals or 50% of the overall terminal connections and data traffic. However, by network design, each POP is preferably capable of handling double this capacity. That is, each POP is preferably capable of handing all of the connections and traffic from all 100,000 terminals.

As shown in FIG. 16, central server X 1624 receives the transaction packets X 1650, 1654, 1658 (the solid links) from network segment #1 1601 via POP #1 1620 and link 1628 (50% of the overall traffic, as shown at 1630) as well as the transaction packets X 1662, 1666, 1670 (the solid links) from network segment #2 1612 via POP #2 1622 and link 1636 (the other 50% of the overall traffic, as shown at 1638). Consequently, central server X receives 100% of the transaction traffic generated by all the terminals (network segment #1 1601+segment #2 1602), as shown at 1644.

In the a similar manner, central server Y 1626 receives the transaction packets Y 1652, 1656, 1660 (the dotted links) from network segment #1 1601 via POP #1 1620 and link 1632 (50% of the overall traffic, as shown at 1634) as well as the transaction packets Y 1664, 1668, 1672 (the dotted links) from network segment #2 1602 via POP #2 1622 and link 1640 (the other 50% of the overall traffic, as shown at 1642). Consequently, central server Y receives 100% of the transaction traffic generated by all the GM terminals from network segment #1 1601 and network segment #2 1602. Communication link 1648 enables the servers 1624, 1626 to be resynchronized in accordance with the model shown in FIG. 15 should a terminal or a plurality of terminals detect missing server acknowledgments.

In a geographically dispersed network of gaming machines, there is usually a plurality of POPs that are sufficiently separated such that the failure of a network path via a POP does not affect the network path via another POP. Moreover, one or several of the sites may be located in a different country. It will be appreciated by those of skill in the art that the network architecture shown in FIG. 16 may be readily scaled up to N-servers/N-transactions.

FIG. 17 shows the network 1600 of FIG. 16 in the case of a load failover. Should POP #1 1620 fail, the configuration shown in FIG. 17 applies. POP #1 1620 is inoperative as shown at 1621. According to an embodiment of the present invention, under predetermined instructions by the network management unit, the entirety of the transaction traffic that would otherwise be routed to POP #1 1620 from network segment #1 1601 is transferred to the other POP #2 1622, which then receives 100% of all of the transaction traffic from the terminals or gaming machines GM in network segments 1601 and 1602. As detailed below, under such a configuration, each of the servers 1624 and 1626 continues to receive 100% of the traffic generated by all the terminals.

Indeed, the terminals in network segment #1 1601, upon detection that network communication via POP #1 1620 is inoperative as suggested at 1621, will re-establish a communication link with the network 1623 by accessing the POP #2 1622. Consequently, 100% of the transaction traffic from all the terminals is routed via POP #2 1622. Central server X 1624 and central server Y 1626 each receive 100% (as shown at 1638 and 1642) of the terminal transaction respectively via link 1636 and via link 1640. Transaction traffic channeled to server X 1624 originates from the X transaction packets 1650, 1654, 1658, 1662, 1666 and 1670 (the solid links), and transaction traffic channeled to server Y 1626 originates from the Y transaction packets 1652, 1656, 1660, 1664, 1668 and 1672 (the dotted links).

It will be appreciated that extending the topology shown in FIG. 17 to a topology wherein a plurality of POPs are accessible by terminals is straightforward to those of skill in the art. In that case, the network management unit would predetermine a suitable strategy for terminals whose POP fails to call an alternate POP.

Figure 18:
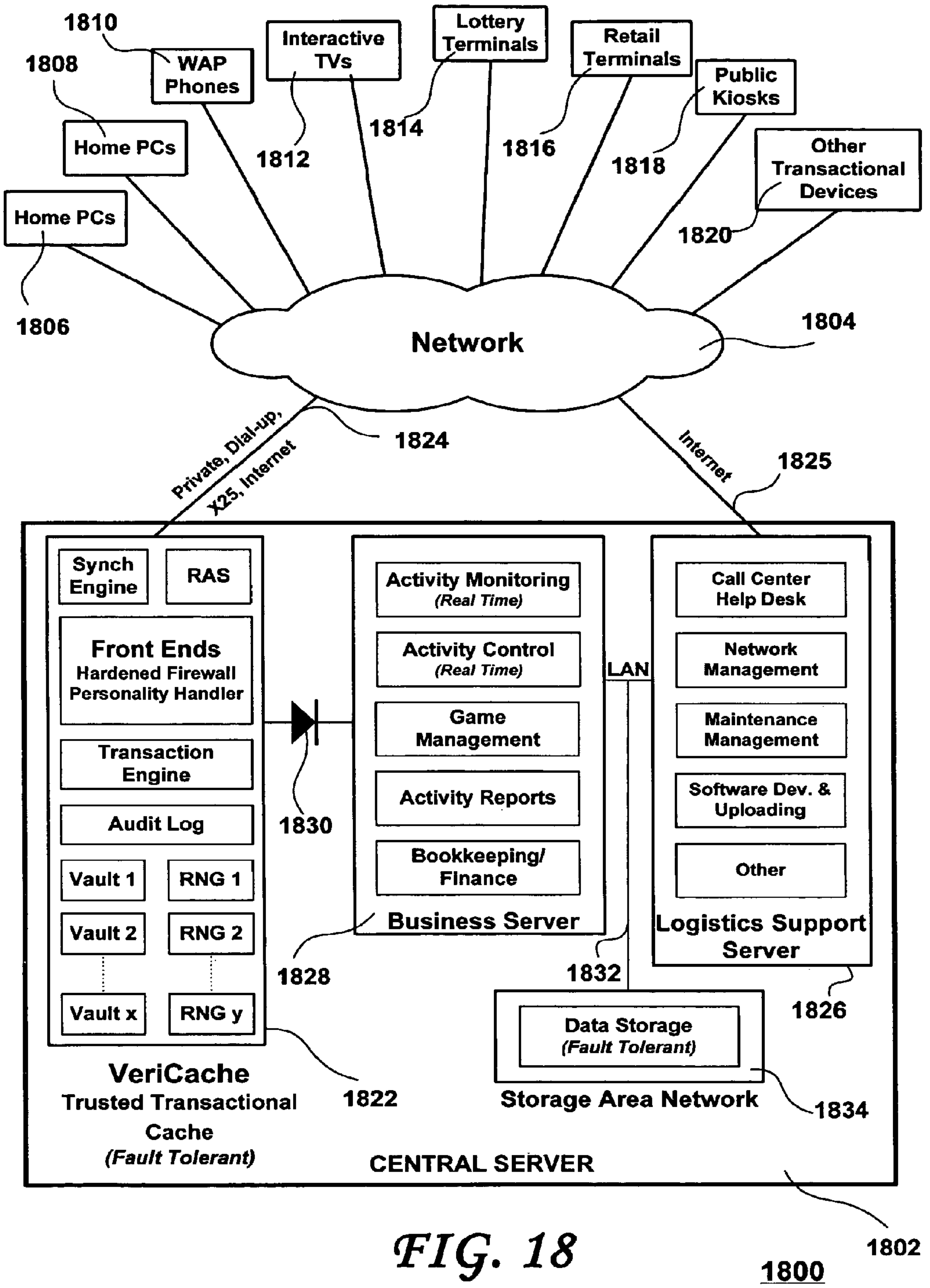
FIG. 18 shows a system architecture overview, according to an embodiment of the present invention.

FIG. 18 is an overview of a network topology 1800 and a system architecture of a universal game server 1802, according to an embodiment of the present invention. The universal game server 1802 is also referred to herein as central server 1802 herein. A second central server or N central servers may be located at geographically distant locations for disaster tolerance. Such second or N central servers, according to an embodiment of the present invention operate synchronously in accordance with the synchronization principles described above, and a link between the central servers 1802 allows for resynchronization. The central servers 1802 may be located in different states or different countries. Operating the transactional terminals, the network and the central servers is commonly referred as "the operations", and the contractor that run the operations, the "the operator".

The central server 1802 may include three main elements; namely, (a) the trusted transactional cache 1822, (b) the business server 1828 and (c) the logistic support server 1826. At least one of the N central servers shall have all three elements 1822, 1828 and 1826; other servers need only include element the trusted transactional cache 1822 to provide synchronized disaster tolerance capability. A large storage capacity Storage Area Network (SAN) 1834 may also be provided. A single business server 1828 for the entire operations may be located at a central place, and the logistic support server 1826 for the entire operations may be located at another central place. All three elements may be located at a same site to minimize operational costs, but this is not a technical requirement. The business server 1828 and the logistics support server 1826 may be coupled to one another via a Local Area Network (LAN) connection 1832.

The central server 1802 may be configured to connect to a wide variety of terminal transaction devices such PCs 1806, Mobile/Handheld PCs 1808, WAP phones 1810, Interactive TVs 1812, Lottery Terminals 1814, Retail terminals 1816, Public Kiosks 1818, and any other kinds of transactional devices 1820. These devices may run any type of operation systems such as Microsoft Windows, Linux, UNIX, Macintosh, Pocket PC, Symbian, real-time kernels and custom operating systems or equivalent. These terminals may connect to a private or public network 1804 and may connect to the central server 1802 via a least two links, one link 1824 that connects to the trusted transactional cache 1822 and one link 1825 that connects to the logistic support server 1826.

Figure 19:
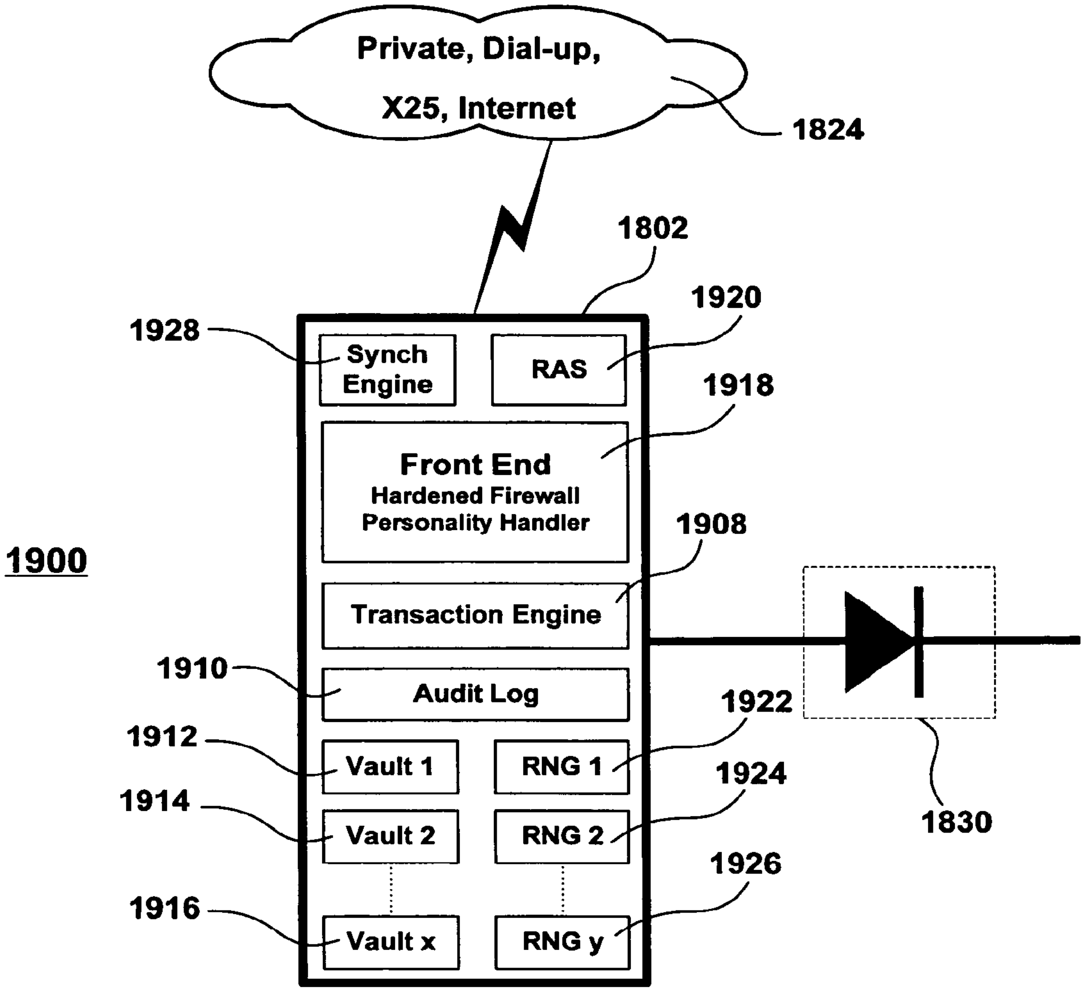
FIG. 19 shows a trusted transactional cache overview, according to an embodiment of the present invention.

FIG. 19 illustrates a portion 1900 of the system shown in FIG. 18, and shows the top-level architecture of the trusted transactional cache 1822. The trusted transactional cache 1822 or TTC is also referred to herein as "VeriCache™". VeriCache™ 1822 is an important part of the central server 1802 in that it provides fundamental services required for handling game transactions; namely, data integrity, transparency, security and guaranteed response time. The combination of these four factors characterizes the trust in the "trusted transactional cache" 1822. This trust is achieved thanks to the proprietary (necessary for audit purposes) developed software code that is kept in its simplest possible form. Complex third party software such as hugely complex relational databases and web server technologies is, therefore, disfavored. For data management, for example for defining, querying and updating the attributes of the transaction terminals (say 1 million terminals and/or users), a simple and very efficient in-memory flat database technique may advantageously be used.

It is important to note that the trusted transactional cache 1822 is indeed a "cache". That is, the trusted transactional cache 1822 provides real-time temporary storage for raw data and is optimized for simplicity, data integrity, transparency, security and performance. Data manipulation is kept to a strict minimum. The transactional information (inbound and outbound) is stored in several places using a synchronized persistent storage technique such that any system failure does not result in any data loss, thus insuring what may accurately be termed "zero-loss data integrity". Disaster tolerance with zero-loss data integrity in case of a major disaster striking a central center 1802 is provided by one or more geographically remote synchronized central servers as described previously. All the data processed by the trusted transactional cache is made available to the business server 1828 (see also FIG. 20) via a "one-way" link shown in FIGS. 18 and 19 at reference 1930. This one-way link is conceptually represented by the diode symbol. The one-way function may be provided by proprietarily developed software (preferred as source code may be totally audited) or by a trusted firewall configured to ensure only a one-way traffic. That is, the trusted transactional cache 1822 is preferably configured such that it cannot receive external data via the link 1930, nor can it allow any access such as remote logging.

The entire trusted transactional cache 1822 should preferably reside in a secure room fitted with transparent glass walls, video surveillance, biometric access and no permanent user console access. Control may only be via the user console located inside the room.

The transaction engine 1908 and the audit log 1910 are the most sensitive and most trusted elements of the trusted transactional cache 1822. The transaction engine 1908 receives an inbound transaction payload from a remote terminal and returns an outbound transaction payload to be forwarded back to the originating terminal. The inbound transaction payload (or inbound game payload or inbound payload) may be defined as the minimal set of information that is required to compose a valid game transaction, such as the terminal ID, user ID (optionally), transaction GUID (global unique identifier), terminal originating/return address (optionally), the game ID, the game bet (player's selected numbers or symbols), amount wagered (optionally), data integrity coding and a number of acknowledgement signals. Some of the data, for example the optional data, may be derived at the TTC 1822 through a database look-up, thus the payload may be kept very small. For example, an inbound payload for a comprehensive lottery slip scanned at a terminal may be no larger than about 80 bytes. The payload as defined here corresponds to the ISO Layer 7 application layer in that it does not comprise any layer element for forwarding the packet through the network.

Similarly, the outbound transaction payload (or outbound game payload or outbound payload) may be defined as the minimal set of information that is required to compose a valid game transaction return, such as the transaction GUID, the amount won, data integrity coding and a number of acknowledgement signals. For example, an outbound payload packet for a lottery terminal may be no larger than 50 bytes. The exact composition of the inbound and outbound payload packets vary according to the types of game available, the regulatory requirements and the game model (deferred-draw or instant-draw, for example).

A transaction packet from a terminal is forwarded to the Front End 1918 in the TTC 1822 via a network 1804 and either the synchronization engine 1928 (such as shown at 1550 and 1552 in FIG. 15) or a remote access server (RAS) 1920. Depending on the type of network access, the link may be through the RAS 1920 or directly to the Frond End 1918. The Front End 1918 may be configured to strip the inbound packet in order to only deliver the inbound game payload to the transaction engine 1908. After processing the inbound payload, the transaction engine 1908 logs the details of the transaction including the relevant inbound payload and outbound payload to a trusted audit log 1910. An outbound payload packet may be returned to the originating terminal to acknowledge the successful processing of the transaction by the central server 1802 only if a log for that transaction has been physically written in at least two separate persistent storage units, to ensure disaster-proof fault tolerance. In this manner, the sudden failure of one storage element, of other elements in the TTC 1822, or of the entire TTC system 1822 will not compromise data integrity. In case of a disaster whereby the entire TTC 1822 cannot be returned to an operational state, a distant central server 1802 (in the N-transaction model) processing the same transaction will ensure the integrity of the terminal transaction. Furthermore, the trusted audit log 1910 is preferably controlled by a read-only mechanism whereby the information is logged sequentially and can never be modified nor erased.

The trusted audit log 1910 may be periodically dumped or backed-up onto write-once media such as CD-ROMs. Preferably, backing up the trusted audit log 1910 is carried out using a robotic CD-ROM or DVD duplicators, such as available from Rimage Corp (www.rimage.com), for example. As a result, no human is required to penetrate the secure room in which the TTC 1822 is located to perform multiple copies on multiple brands of media and print the identification labels. Moreover, a ramp is preferably added that guides the finished CD-ROM or DVD directly into a fireproof safe. Such fireproof safe with automatic entry of the written CD-ROM or DVD is named a vault FIG. 19. The TTC 1822 may be coupled to or include one or several vaults 1912, 1914, 1916 whereby a given vault or vaults may be assigned to a given game event (or events) or for a game jurisdiction (or jurisdiction). Procedures for physical access to and removal of the recorded audit logs stored in the vaults 1912, 1914, 1916 are in accordance with stringent requirements as mandated by regulators.

The trusted audit log 1910 is preferably recorded in a simple data format that may be easily audited by the regulators or their assigns using a third party utility. Preferably, entries in the trusted audit log 1910 are made in the text format, whereby an auditor may examine part or the entire log or perform a search using a standard text editor or word processor. All of the information contained in the trusted audit log 1910 may be forwarded to the business server 1828 for automatic financial reconciliation or import into a relational database for data mining.

In the case wherein the central server 1802 is configured to handle transactions for games following the central instant-draw model, whereby the outcome of a game waged by a player at a terminal is determined immediately and the amount won (if any) is returned in the outbound game payload, one or a plurality of random number generators (RNG) 1922, 1924, 1926 may be added to the TTC 1822, preferably inside the secure room. The outcome for each game transaction together with the number(s) drawn by a RNG is immediately recorded in the trusted audit log 1910 following the same "fault tolerant persistent synchronized storage" principles detailed above.

Figure 20:
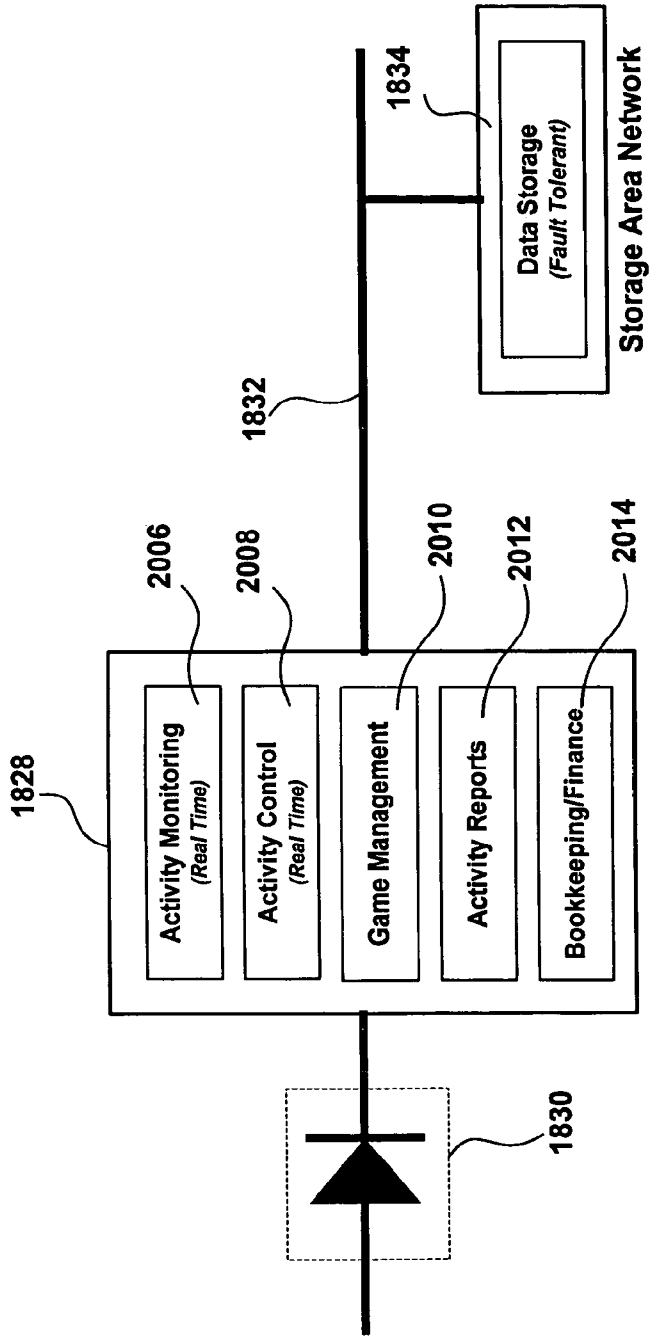
FIG. 20 shows a business server overview, according to an embodiment of the present invention.

FIG. 20 illustrates a portion 2000 of the system shown in FIG. 18 and illustrates the top-level architecture of the Business Server (BS) 1828. The BS 1828 receives a copy of all the information handled by the TTC 1822 that is relevant to the conduct of the game business via the link 1830. The information is provided asynchronously, that is, it is derived from the trusted audit log 1910 in a low priority optimized format such that the ability of the TTC 1822 to service a very large number of terminals is not impacted. The data transfer from the TTC 1822 may be effectively carried out in batch, with a time delay typically not exceeding one or two minutes from the real event that caused the generation of the information. The received data may be imported into a traditional information-processing environment comprising commercial database packages (relational, object oriented or other type) and/or other custom modules. The BS 1828 may include an activity monitoring module 2006 that reflects in near real-time the overall and detailed business/game activity of the operations, an activity control module 2008 for real-time configuration of the various game events; a game management module 2010 for configuring the various game parameters in accordance with a strategy or regulatory requirements, analyze the performance metrics of the system and dynamically adjust configuration with the analysis outcome in a close loop fashion; an activity reporting module 2012 that mines the database and prepare graphical reports in a format such that managers can readily understand the dynamics of the operations in order to make the necessary optimization to maximize revenues; and a bookkeeping/financial module 2014 that complies with applicable tax laws and game regulations. The business server 1828 is preferably equipped with a firewall (not shown in FIG. 20).

Standard business IT security procedures may be applied to the business server 1828 such that the users thereof are provided the most flexible and most efficient tools to manipulate the data to conduct the game business. For example, standard database access control is sufficient. Should a doubt be raised regarding the veracity or integrity of a given transaction, the CD-ROM produced by the Trusted Audit Log 1910 may be examined for comparison and for determining the cause for the discrepancy (procedural error, data corruption or fraud, for example). All of the LSS data (described below) may be centrally stored in the Storage Area Network 2024.

FIG. 20 illustrates a portion 2100 of the system shown in FIG. 18 and illustrates the top-level architecture of the Logistic Support Server 1826. The Logistic Support Server or LSS 1826 supports all the information technology tasks in a large scale gaming operation that are not handled by the trusted transaction cache 1822 and the business server 1828.

Microsoft Encarta® Reference Library 2003 defines "Logistics" as: involving complicated organization, involving the planning and management of any complex task. If the "Support" attribute is added to form "Logistics Support", it is clear that the role of the Logistic Support Server 1826 is important.

According to embodiments of the present invention, the LLS 1826 may be a single server or an aggregate of servers located at one site or across several distributed sites. The LLS 1826 preferably takes advantage of all current Internet and Intranet technology advances such as for example available from Microsoft, Windows 2003, Internet Information Server IIS6, web farms load balancing, Internet Security and Acceleration (ISA) Server, SQL Server relational databases, Clustering, XML, InfoPath, SOAP, Biztalk, Office, Project, SharePoint Portal Server (collaborative technology), Exchange email server, Mobile Information server, SQL Server Notification Services Notification server, System Management Server (SMS), Microsoft Operations Manager (MOM), Visual Studio and Software Update Services (SUS).

The business server 1828 communicates with the Internet 1804 via for example a comprehensive firewall infrastructure such as Microsoft ISA Server enterprise security firewall (not shown in FIG. 21 for simplicity). The LSS 1826 may comprise a web server farm 2110 containing a large number of Internet servers in order to deliver the numerous services of the LLS 1826 to users and systems of the game operations over the Internet and Intranet. A number of web servers may be delivering the rich page content to the terminals while the transactions are routed to the trusted transaction cache 1822 in accordance with the principles detailed above relative to FIG. 11 and below relative to FIG. 22. The LSS 1826 communicates with the business server 1828 via the network link 1832.

The LSS 1826 may also include a call center help desk 2112 constructed using the latest Internet telephony, email, alert notification services, subscription notification services and collaborative technology in order to provide automated and/or human support to users and players. As shown, the LSS 1826 may comprise a network management unit 2114 that monitors and controls the entire or portion of the communication network between the terminals and the central server(s) 1802. The LSS 1826 may comprise a maintenance management unit 2116 that manages the deployment and maintenance of all the terminals, servers and communication equipment. In addition, service vehicle fleet management may be provided using tracking GPS devices and web map services such as Maporama.com and Microsoft MapPoint, for example. In addition, the LSS 1826 may include a comprehensive software development and upgrade unit 2118 for producing managed software code, certifying code in accordance with applicable game regulations and downloading game code as well as system and utilities updates. Indeed, the software development and upgrade unit may be distributed geographically in accordance with the localization of the developers and various software support personnel. The LSS 1826 may also include other computer infrastructure 2120 for supporting the game operations that are channeled via the web server farm 2110. All of the LLS data may be centrally stored in the SAN 1834.

Figure 22:
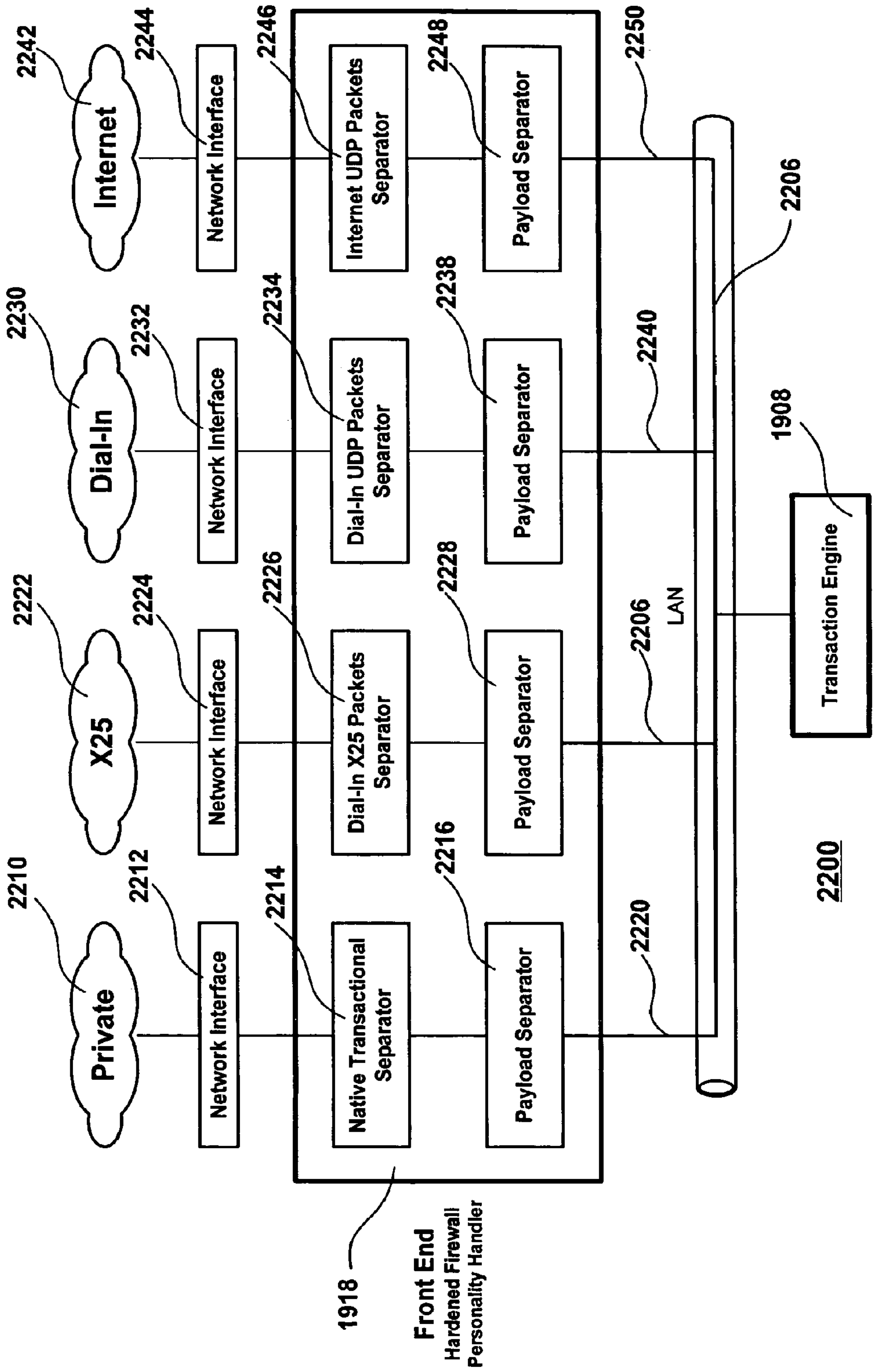
FIG. 22 shows a personality front-end overview, according to an embodiment of the present invention.

FIG. 22 illustrates the top-level architecture 2200 of the personality front end (PFE) 1918. As can be seen in FIG. 18, the PFE 1918 is part of the trusted transaction cache 1822. The PFE 1918 may be configured to intercept all the transaction traffic with the terminals via the network 1804 through link 1824. Link 1824 may comprise a variety of network protocols such private 2210, X25 2222, dial-in 2230 and the Internet 2242, for example. The PFE may also be configured to intercept traffic through links configured for other protocols, as will occur to those of skill in this art. Each network may require a specific network interface equipment 2212, 2224, 2232, 2244 for allowing interfacing with the PFE 1918 via a standard local area network such as Ethernet.

The role of the PFE 1918 is to extract the inbound game payload (application layer 7) from the inbound network communication packet sent by the terminal that is received at the central server 1802, and to stuff the outbound game payload (application layer 7) into the outbound network communication packet sent back to the terminal. The inbound game payload is destined to the transaction engine 1908 and the outbound game payload is produced by the transaction engine 1908. Such architecture allows the transaction engine 1908 to be unaffected by the type of communication protocol employed by the terminal to communicate with the central server 1802. If the transaction information produced and understood by the terminal is specific, the PFE 1918 transcodes the differences such that the transaction engine 1908 may treat the transaction information as generic. Consequently, the transaction engine 1908 is kept unaware of the "personality" of the transaction terminals. Such architecture whereby the personality of the transaction terminals filtered is advantageous as it prevents making unnecessary changes to the highly optimized yet simple transaction engine 1908 and the trusted audit log 1910; consequently, maximum trust is retained.

For game transaction terminals that communicate via the private network 2210, the native transactional separator or filter 2214 handles (for both inbound as well as outbound traffic), the peculiarity of the proprietary private communication protocol. The filter 2214 is linked to the payload separator or transcoder 2216 that adapting the transaction packet format on the link 2220 such that it complies with the generic format supported by the native transaction engine 1908. For game transaction terminals that communicate via the X25 network 2222, the Dial-in X25 packets separator or filter 2226 handles for both inbound and outbound traffic, the peculiarities of the X25 communication protocol. The filter 2226 is linked to the payload separator or transcoder 2228 that further adapts the transaction packet format on the link 2206 such it complies with the generic format supported by the native transaction engine 1908. For game transaction terminals that communicate via the dial-in network 2230, the dial-in UDP packets separator or filter 2234 handle, for both inbound and outbound traffic, the peculiarity of the dial-in communication protocol. Here, it is assumed that the protocol used is the UDP protocol, although other protocols may be implemented. The filter 2234 is linked to the payload separator or transcoder 2238 that further adapts the transaction packet format on the link 2240 such that it complies with the generic format supported by the native transaction engine 1908. For game transaction terminals that communicate via the Internet 2242, the Internet UDP packets separator or filter 2246 the peculiarity of the Internet communication protocol for both inbound and outbound traffic. Here, it is also assumed that the protocol used is the UDP protocol, although other protocols may be utilized. The filter 2246 is linked to the payload separator or transcoder 2248 that further adapts the transaction packet format on the link 2250 such that it complies with the generic format supported by the native transaction engine 1908.

The array of filters and transcoders existing in the PFE 1918 constitutes a formidable firewall; no unidentified or unauthorized packet may transit inbound past the PFE 1918. Indeed, sophisticated intrusion analysis techniques (including forwarding of the traffic to an off-site security specialist such as counterpane.com) may be employed to track down the origin of any anomaly or fraud.

The N-Transaction/N-Server model described herein is well adapted to the deferred-draw as well as to the immediate-draw gaming model. Deferred-draw refers to games whereby the player wager is placed at a given instant in time, and the draw occurs at a later point in time. Traditional slip-scan lottery and sport betting (where legal) are examples of deferred-draw whereby the player buys his wager several days before the draw or the event that determines the outcome; the draw or event may be shown life on TV. Disaster tolerance for differed-draw is essential so as not to loose the record of the player's wager to allow the player to claim or verify winnings. This is especially important in jurisdictions having regulations that mandate on-line storage of transactions for 6 or even 12 months. The N-Transaction/N-Server model is ideally adapted in the case of a lottery run in a developing country whereby the network infrastructure, power infrastructure or political maneuvers is unpredictable; having a remote transaction server in another stable country avoids the risk of compromising the data integrity of the gaming system.

In the case of the immediate-draw gaming model, the embodiments of the present invention may be configured under the control of the network management unit 2114 to simplify the network traffic. With the immediate-draw model whereby the outcome is determined immediately (e.g., using RNG at the central server, or using a RNG locally at the transaction terminal as is the case with casino gaming machines) before the transaction receipt is returned to the user/player at the terminal, there is no requirement to safely keep historical transaction data for an extended period of time. The players know immediately (within seconds) whether they have won or lost. Therefore, for immediate-draw, geographically dispersed load balancing present a simplified configuration alternative to the N-Transaction/N-Server model.

Figure 23:
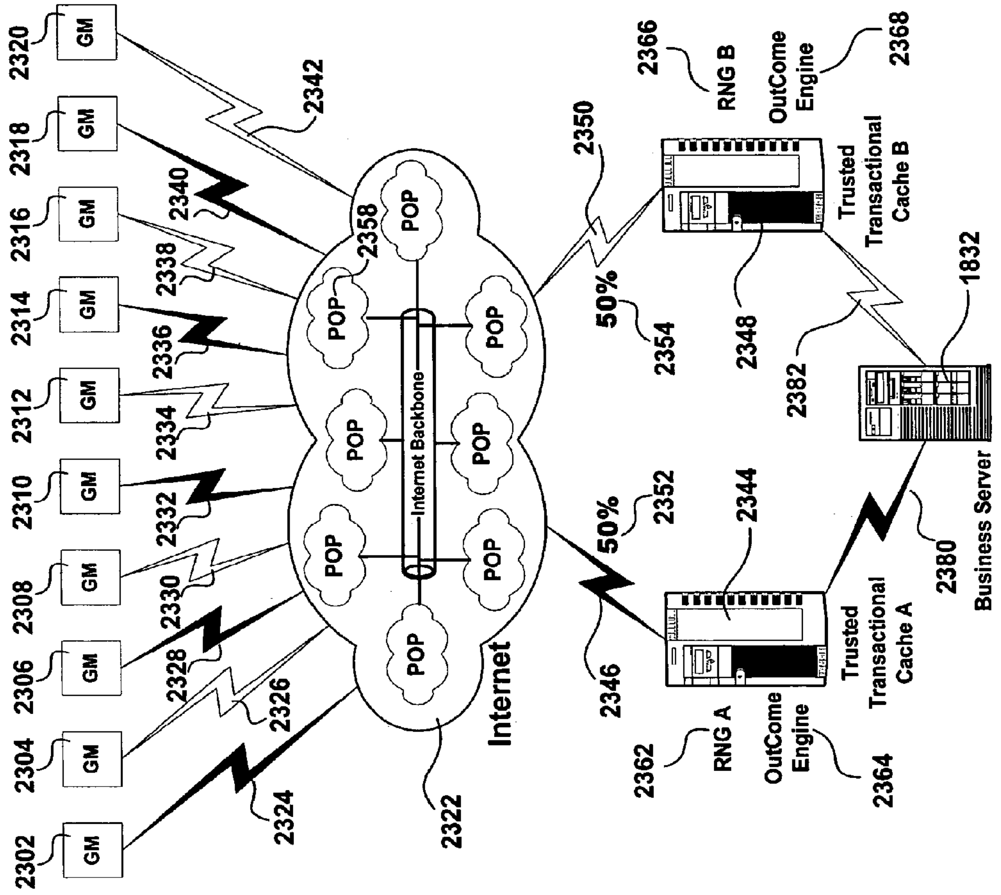
FIG. 23 shows 2-sites geographically dispersed load balancing, according to an embodiment of the present invention.

FIG. 23 at 2300 illustrates a two-site geographically dispersed load-balancing configuration of an embodiment of the present invention, assuming here that the network 2322 is the Internet. The same configuration would be applicable to non-Internet networks. In the configuration, two geographically separated trusted transactional caches TTC-A 2344 and TTC-B 2348 are connected to the Internet 2322 via respectively link 2346 and link 2350. TTC-A 2344 comprises a random number generator RNG-A 2362 that determines the instant draw for this TTC, and TTC-B 2348 comprises a random number generator RNG-B 2366 that determines the instant game draw for this TTC. Outcome Engine 2364 computes the outcome of the game transactions for terminals (e.g., gaming machines (GM) 2302, 2304, 2306, 2308, 2310, 2312, 2314, 2316, 2318 and 2320) connected to TTC-A 2344 and Outcome Engine 2368 computes the outcome of the game transactions for terminals connected to TTC-B 2348.

In the diagram, the Internet 2322 assumes multiple POPs (Points Of Presence) 2358 that may be accessible by the terminals for optimal network resilience or spread of data traffic under the instructions set by the Network Management unit 2114. The terminals 2302, 2304, 2306, 2308, 2310, 2312, 2314, 2316, 2318 and 2320 are configured to send one transaction to a selected TTC, such as TTC-A 2344 or TTC-B 2348. In the exemplary case illustrated in FIG. 23, terminals 2302, 2306, 2310, 2314 and 2318 communicate with TTC-A 2344 via links 2324, 2328, 2332 2336 and 2340, respectively (the black links), and terminals 2304, 2308, 2312, 2316 and 2320 communicate with TTC-B 2348 via links 2326, 2330, 2334, 2338 and 2342, respectively (the white links). In the illustrative case of FIG. 23, therefore, 50% of the terminals communicate with TTC-A 2344 and 50% of the terminals communicate with TTC-B 2348. A single transaction to only one predetermined TTC 2344, 2348 is used. Consequently, each TTC 2344, 2348 independently handles 50% of the transaction traffic. Accordingly, TTC-A 2344 handles 50% of the traffic as shown at 2352 via link 2346 and TTC-B 2348 handles 50% of the traffic as shown at 2354 via link 2350. The business server 1828 may retrieve the transaction logs of both TTCs 2344 and 2348; therefore, the entire game business may be managed. One of the TTCs may be located in a different country. It is to be noted that a unique national access number may be called that will establish a link via an available operative POP, and transparently load balance regional data traffic in the communication network.

Figure 24:
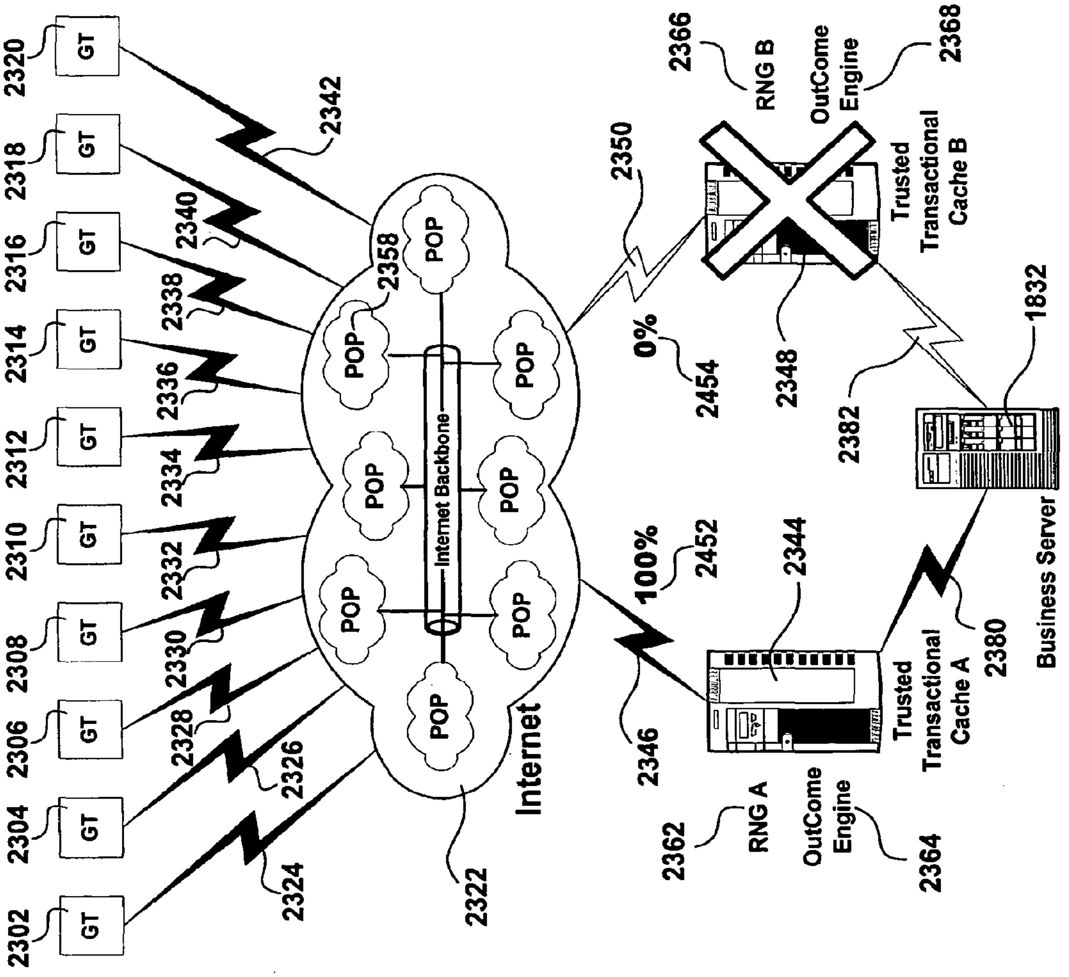
FIG. 24 shows 2-sites geographically dispersed load balancing—failover, according to an embodiment of the present invention.

FIG. 24 at 2400 illustrates the two-site geographically dispersed load-balancing configuration of FIG. 23 and illustrates the failover in the case wherein one of the TTCs becomes inoperative or unreachable (thus 0% of the traffic is carried on link 2350, as indicated at 2454). In this illustrative failure scenario, the terminals that initially attempted to connect to the failed TTC-B 2348 re-attempt connection to the other remaining operational TTC-A 2344 via available operational POPs. Consequently, the entire 100% (as indicated at 2452) transaction traffic is forwarded via link 2346 via the black links 2324, 2326, 2328, 2330, 2332, 2334, 2336, 2338, 2340 and 2342. As TTC-A 2344 executes the immediate-draw thanks to RNG-A 2362 and calculates the outcome using the outcome engine 2364, the non-accessibility to the raw transaction historical data does not impact the game operations for the terminals that were previously connected to the failed TTC-B 2348. Historical business data has been retrieved by the business server 1828 while TTC-B 2348 was in operation. Therefore, only a few seconds of historical data may be unavailable. The business server is coupled to the TTCs 2344, 2348 via the links 2380 and 2382.

Figure 25:
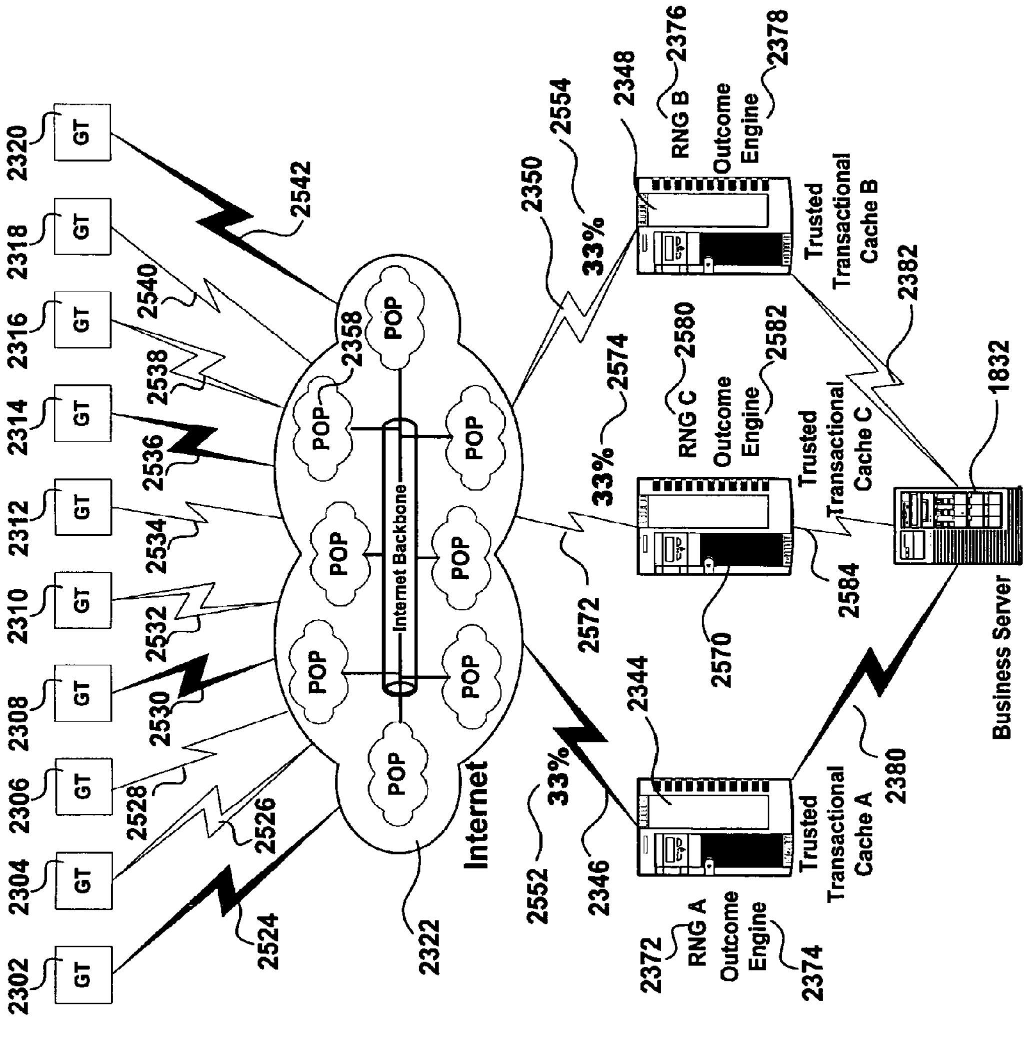
FIG. 25 shows 3-sites geographically dispersed load balancing, according to an embodiment of the present invention.

FIG. 25 illustrates at 2500 a three-site geographically dispersed load balancing, according to an embodiment of the present invention. As shown, FIG. 25 is an extension of the two-site geographically dispersed load balancing described in FIG. 23 by the addition of TTC-C 2570. TTC-C 2570 includes a RNG 2580, an outcome engine 2582 and is coupled to the business server 1828 via a link 2584. Here, the transaction load is balanced over three TTCs 2344, 2570 and 2348, each handling about 33% of the transactional traffic of the terminals 2302, 2304, 2306, 2308, 2310, 2312, 2314, 2316, 2318 and 2320, as shown at 2552, 2574 and 2554. As shown, TTC-A 2344 handles the transactional traffic routed over the black links 2524, 2530, 2536 and 2542, TTC-B 2548 handles the transactional traffic routed over the white links 2526, 2532 and 2538 and TTC-C 2370 handles the operational traffic routed over the thin links 2528, 2534 and 2540. One or more of the TTCs may be geographically dispersed, such as located in different areas, states or countries, for example.

Figure 26:
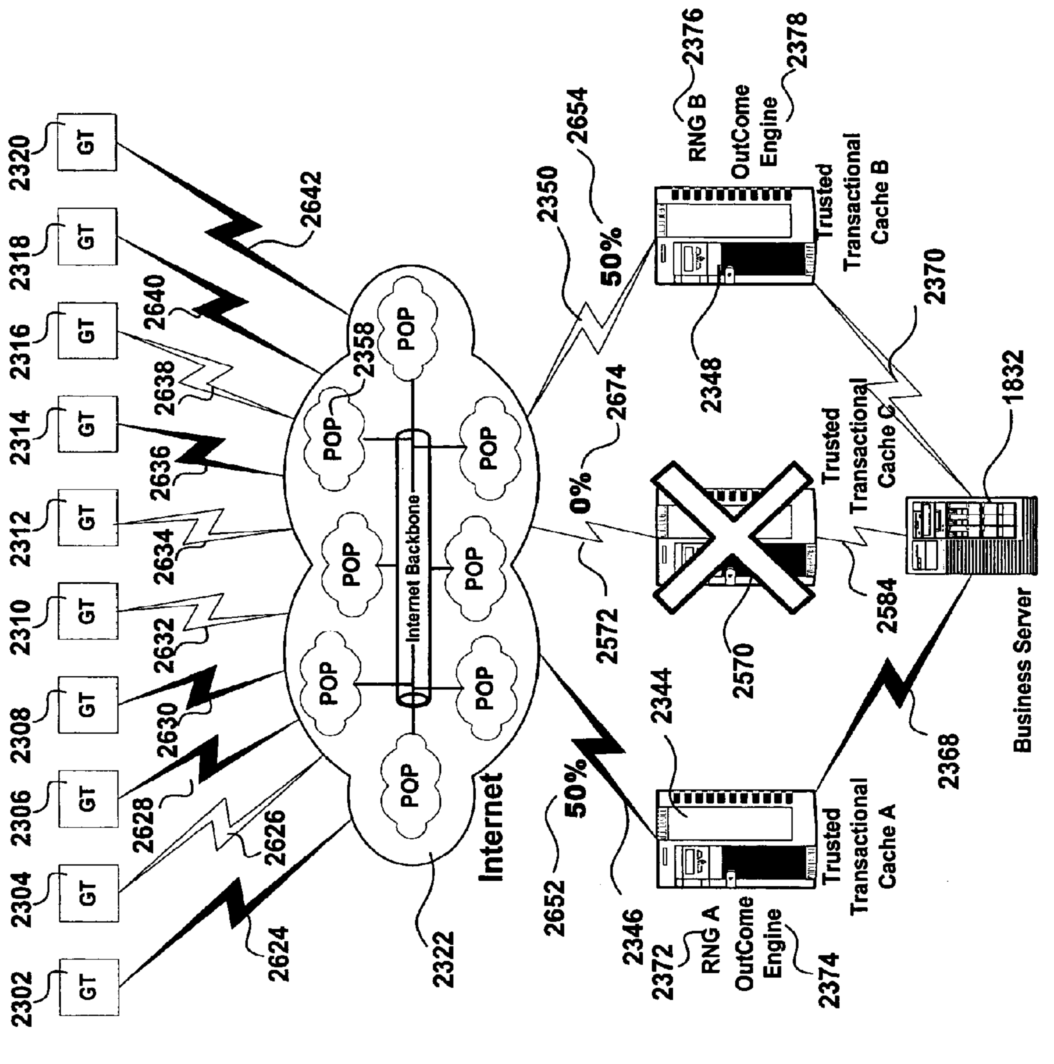
FIG. 26 shows 3-sites geographically dispersed load balancing—failover, according to an embodiment of the present invention.

FIG. 26 illustrates at 2500 the three-site geographically dispersed load-balancing model shown in FIG. 25 and illustrates the failover when one of the TTCs of the system is inoperative or otherwise unreachable. For example, when TTC-C 2570 is unreachable or inoperative, the terminals previously connected to TTC-C will attempt to contact an alternative TTC (TTC-A 2344 or TTC-B 2348 in this case) in accordance with a predetermined connection contingency strategy defined by the network management unit. Here, the failover strategy for one failed TTC results in the two other TTCs 2344, 2348 each taking 50% of the transaction traffic load as shown at 2652 and 2654 while the traffic load for TTC-C 2570 is reduced to zero, as shown at 2674. Should a second TTC also fail, the remaining TTC will take 100% of the load as described relative FIG. 24. It will be appreciated by those of ordinary skill in the art that extension to a N-Sites geographically dispersed load balancing topology is straightforward.

Random Game Number Generator

The purpose of random game number generation is to produce unpredictable and unrepeatable game numbers (or symbols), which are in turn applied to a software game outcome module that determines the amount won (or lost) in accordance with applicable game regulation and a pay table. The amount won (or lost) is called the game outcome; however, the game outcome may also refer to simply the random game numbers (or symbols). Hereunder, we refer to game outcome for either case.

Good random number generation is vital for producing game outcome. These random numbers are typically provided by special algorithms called pseudo random number generators (PRNGs) in software or specialized hardware random number generators (RNGs). Pseudo random number generators (PRNGs) are software algorithms that take a random seed and generate streams of random bits that are normalized to produce random game numbers (or symbols). Generating a seed that cannot be predicted or repeated is especially important in gaming. There are a number of sources for unrepeatable seeds. The best source may be a hardware noise generator. One such implementation interfaces is with Intel Corporation's Random Number Generator. Other seed-gathering methods involve tracking mouse movement or timing keystrokes, system time, or processor-elapsed time. There may be other schemes that do not depend on someone entering a value from the keyboard.

Once the PRNG is seeded, it can produce a sequence of random bits or bytes; these bytes are "more random" and are generated more quickly than the seed, typically hundred thousand times faster than a hardware random number generator.

For example, the RSA Crypto-C software security component http://www.rsasecuritv.com/products/bsafe/cryptoc.html includes PRNGs that are designed to ensure good algorithmic properties.

The hardware-based Intel Random Number Generator included in the Intel® 8XX series of PC motherboard chipsets is a good option that enables game application to get the high-quality, high-entropy bits that are needed. Information on Intel RNG may be found at http://www.intel.com/design/security/rng/rngppr.htm.

The Intel Random Number Generator is a dedicated hardware component that harnesses thermal noise to generate random and non-deterministic values. The generator is free running, accumulating random bits of data until a 32-bit buffer is filled. In addition, the bits supplied to the application have been mixed with a SHA1 hash function for added security under extreme conditions of voltage and temperature. The bits the Intel RNG supplies have been whitened by the hardware; that is, a post-processing algorithm has been applied to reduce patterns in the hardware bits and make them less predictable. The advantage of performing whitening in software as well as hardware is that an attacker must modify the hardware and the software to make the Hardware RNG leak secret information.

The Intel RNG generates the seed bits needed to produce high quality non-predictable game outcomes. In a few milliseconds, the Intel RNG can produce all the random bits needed to seed a game application. This is significantly faster than the software mechanisms for gathering unpredictable bits. Software mechanisms can take as long as ten seconds to gather a seed and often require user input (for example, via the mouse or keyboard).

The present universal game RNG, according to an embodiment of the present invention may be configured to interface with a hardware random number generator, to seed a PRNG, to record a trusted log and to produce on-demand random game numbers at a significantly high rate.

Figure 27:
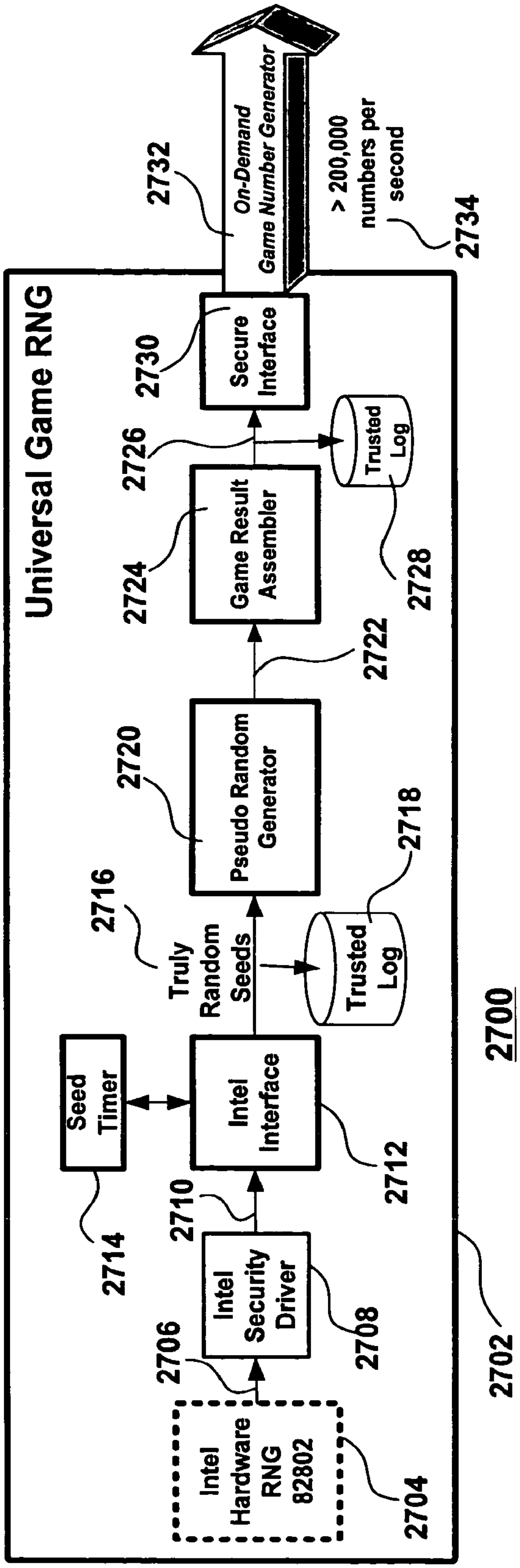
FIG. 27 shows Universal Game Random Number Generator (RNG), according to another embodiment of the present invention.

FIG. 27 illustrates the universal game RNG 2700 configured for gaming applications, according to an embodiment of the present invention. The universal RNG 2702 comprises both hardware and software components. The hardware component may include a hardware-based RNG 2704 such as, for example, the Intel® 82802 firmware hub (in fact, random number generation is one of the functions of the Intel® 82802). Alternatively, the hardware-based RNG may be a function directly that may be directly integrated into future generation secure processors from, for example, Intel® and AMD® or other motherboard chipsets as required for compliance with (for example) Microsoft Next-Generation Secure Computing Base (NGSCB), formerly referred under the code name "Palladium". Alternatively still, the hardware RNG of the present embodiment may be or include any other type of solid state device embedded on the motherboard, mounted on the motherboard, plugged into the motherboard or inserted into a slot or interface, including a secure smart card or similar secure smart devices. The hardware RNG may also be a quantum-effect RNG interfaced to the motherboard, for example.

The hardware RNG 2704 may be controlled by a specific software driver 2708 such as the Intel Security Driver, for example, in order to securely capture random binary seeds 2706 generated by the hardware RNG 2704. These captured seeds may then be securely delivered by the security driver 2708 as shown at 2710 to an application level such as an Intel Interface software module 2712, for example. The rate of seed delivery may be controlled by a seed timer 2714. For example, seeds may 64 bytes long, and the seed rate may be configurable from 1 to 100 per second. Preferably, seeds may be generated continuously, even when there is no demand for the seeds at the interface 2732.

A pseudo-random number generator 2720 such as, for example, the RSA Crypto-C RNG component is therefore seeded by truly random seeds 2716 produced at a predetermined rate under the control of the seed timer 2714. A trusted log 2718 may log securely the random seeds 2716, for subsequent audit.

High quality random binary numbers 2722 may now be produced at a very high rate. A Game Result Assembler software module 2724 converts the random binary numbers into "ranging" random numbers, that is, random decimal numbers ranging between two predetermined values such as 1 and 80 for keno games, without introducing unacceptable coloration, that is, output random numbers no longer having a white distribution because of the unused numbers (dropped numbers). For example, for generating random numbers within an exemplary range of 1 to 80, an 8-bit random blob ranging 0 to 255 is used wherein number 0 and numbers 81 to 255 are thrown away, which process may introduce distortions in the random distribution. Appropriate techniques are applied to minimize coloration. The "ranging" random numbers are commonly named and referred to as the game numbers. For games using symbols, a mapping of the ranging random numbers to a predetermined set of symbols may simply be carried out.

The Game Result Assembler software module 2724 also responds to demands made at 2732 by the client gaming application, that is, game random numbers may be produced "on order" for each client application. The order may include the combination of random ranging game numbers required for a given game draw.

A very fast trusted log 2728 may securely log the high rate random numbers 2726 for subsequent audit. According to an embodiment of the present invention, the trusted log 2728 need not continuously record the high-rate random numbers generated by the pseudo random generator 2720, as these random numbers may be reproduced by retrieving the input random seeds 27216 (which are written to the trusted log 2718 at a lower rate than random numbers would be written to the trusted log 2728) from the trusted log 2718 and feeding them back to the pseudo random generator 2720.

A secure interface 2730 module may provide the necessary level of security when delivering the random game numbers to client applications. Typically greater than 200,000 numbers per second are generated on a 750 MHz single processor Pentium-class machine. This high rate enables the delivery of unique game random numbers for each individual game played on the gaming machines, which offers a substantial improvement compared to conventional batch RNG processes such as described in, for example, U.S. Pat. No. 6,280,328 entitled "Cashless Computerized Video Game System and Method" and assigned to Oneida Indian Nations.

Advantageously, the present universal game RNG may be incorporated into a central server system described herein and/or into each gaming machine described herein. In the case wherein the universal game RNG is incorporated into a central server, the universal game RNG may be included within a PC based workstation, server or motherboard comprising the necessary hardware-based RNG (or equivalent hardware RNG integrated into future generation secure processors such as from Intel and AMD, or other motherboard chipsets as required for compliance with Microsoft Next-Generation Secure Computing Base (NGSCB), or other standard) and the other associated software modules as detailed in FIG. 27. The universal game RNG may communicate with the other elements of the present trusted transactional cache, as shown in FIG. 19. There may be several universal gaming RNGs, as suggested by reference numerals 1922, 1924 and 1926.

In the case wherein the present RNG is integration into each gaming machine, the motherboard of the computer controlling the gaming machine may advantageously be a PC motherboard fitted with a Intel 82802 firmware hub providing hardware RNG or equivalent hardware RNG integrated into future generation secure processors such as from Intel® and AMD®, or other motherboard chipsets as required for compliance with Microsoft Next-Generation Secure Computing Base (NGSCB) or other standard.

Advantageously both the server(s) and gaming machines may make use of the same hardware RNG device such that both types universal RNGs are identical (software is identical). In one case, the present universal game RNG may be configured to produce hundreds of thousands of random game numbers per second, and in the other case only one game random number every few seconds. Consequently, the trust associated with the game RNG in the gaming machine that may deliver top winnings of $100 is the same as the trust associated with the game RNG in the central server that may deliver top winnings of $100 million, the later being subjected to intense quality monitoring and security audits. Consequently, again, an estate of 10,000 gaming machines each having a local universal RNG may have the same trust as an estate of 10,000 gaming machine wherein the universal RNG is located at the central site.

Figure 28:
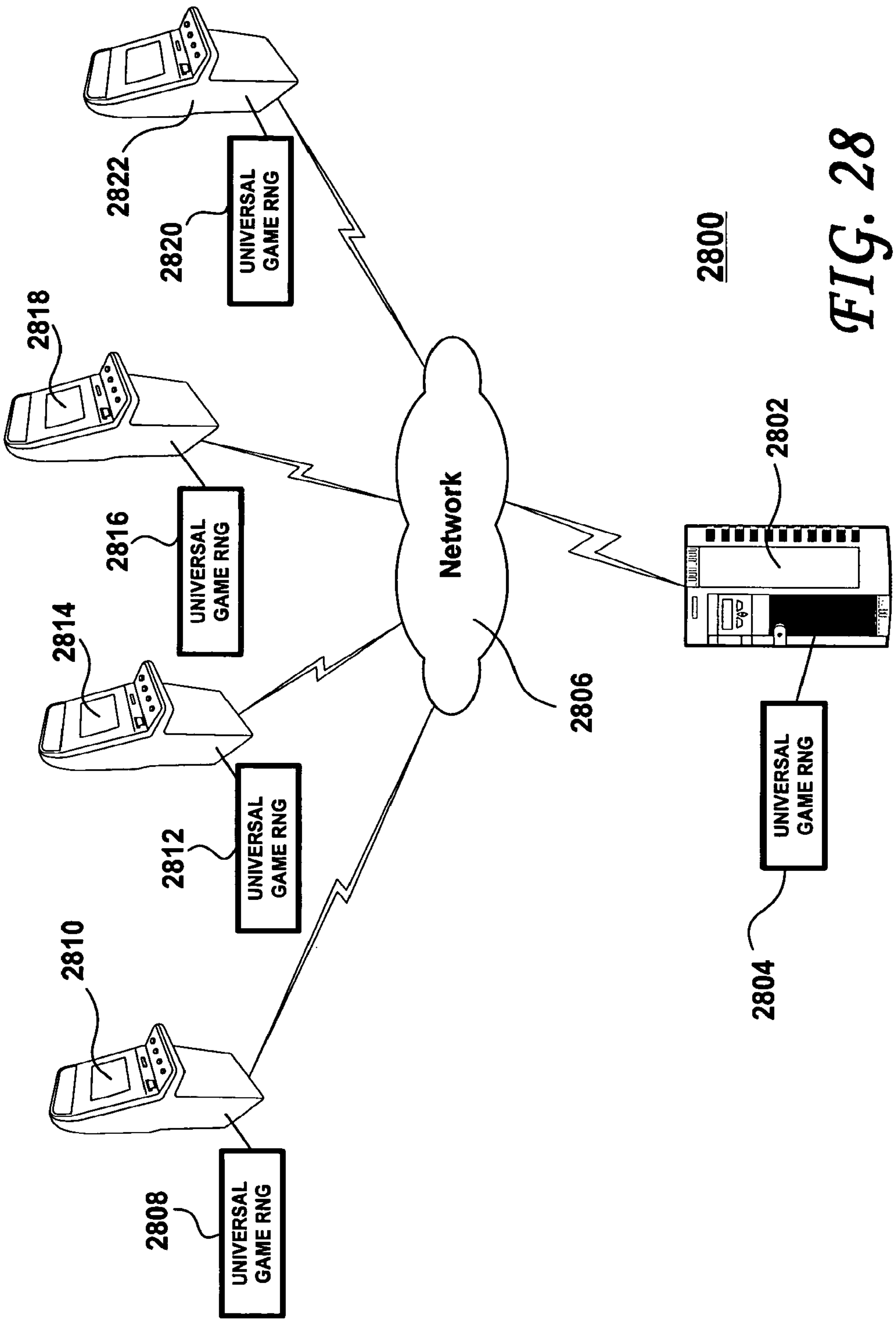
FIG. 28 shows a gaming system and illustrates both localized and centralized random game number generation using the present Universal Game RNG, according to an embodiment of the present invention.

FIG. 28 illustrates at 2800 the localized and/or centralized uses of the present universal RNG. Universal game RNGs such as shown and described relative to FIG. 27 may be incorporated within the gaming machines 2810, 2814, 2818 and 2822, as shown at 2808, 2812, 2816 and 2820. The Universal Game RNGs 2808, 2812, 2816 and 2820 are preferably identical, or at least using a compatible hardware random number generators and associated hardware interface software, such that they may be considered functionally identical. Alternatively, or in addition to the Universal Game RNGs 2808, 2812, 2816 and 2820 incorporated within the gaming machines, one or more Universal Game RNG may be incorporated within the central server system 2802 to provide unique random numbers to each of the gaming machines.

The use of the localized game RNG (i.e., within the gaming machines) or of the centralized game RNG (i.e., within a central game server system) is dictated essentially by applicable game regulations. Considering the universal game server and the network connected gaming machines, whenever permitted, a selected set of games may obtain random game numbers from the localized game RNG, and another selected set of games may obtain random game numbers from the centralized game RNG. Similarly, a selected set of game terminals may obtain its random game numbers from the localized game RNG for all the games that it executes, and another selected set of game terminals may obtain its random game numbers from the centralized game RNG for all the games that it executes. Whenever local game regulations allow some flexibility in the choice of the source of the random numbers, the game operator may choose either a centralized source of game RNG or a localized source of game RNG, in accordance with given strategies, policies or other considerations.

CONCLUSIONS

The present document has set forth the fundamentals of conventional secure on-line game transaction topology, payload protocol and audit transaction log. These fundamentals are preferably retained in any new gaming system to provide stability, performance, transparency and data integrity.

Disclosed herein are embodiments of a universal game server capable of supporting large scale game operations comprising a wide variety and a very large number of game terminals remotely geographically located (region-wide, state-wide, country-wide and worldwide). The concepts of disaster tolerance, either using the N-transaction model or using the N-server geographic load balancing as applied to embodiments of the present invention have been presented in detail, including failover and re-synchronization. The personality front end has been described that filters the "personality" of the terminals such that the highly optimized and trusted transaction engine and its trusted audit log are not impacted, irrespective of the terminals connected thereto. Also disclosed herein is the topology of systems for providing games that appear in a traditional web browser but for which the secure game transaction commit is done by a transaction engine plug-in that sends the transaction to a trusted transaction cache using UDP (for example) packets. The transaction engine plug-in may also support the N-transaction model or may use the N-server geographic load balancing model. The role of the terminal has been highlighted (applicable also to the web browser plug-in) and disclosed as being an active participant in the availability of the overall game system. That is, in the case of the N-transaction model, the terminal will actively contribute to the building of a synchronization log such that the failed trusted transaction cache may be rapidly synchronized upon returning to its operational state.

Concerning the generation of random game outcomes, an embodiment of a universal game RNG is presented herewith that may be used unchanged within the gaming machines or at the central game server. The advantage is that each gaming machine may benefit of a game RNG having the same level trust as the highly audited very high volume central based game RNG, and consequently, that level of trust is inherited for the operation of the entire estate of a very large number of geographically or locally distributed gaming machines having the local game RNG.

Although specific embodiments have been illustrated and described herein, it will be appreciated by those of skill in the art that any arrangement that is calculated to achieve the same purpose may be substituted for the specific embodiments shown. This application is intended to cover any adaptations or variations of the present invention.

What is claimed is:

1. A gaming system coupled to a communication network, comprising:

at least one server being coupled to the communication network; and at least one web browser-based gaming machine coupled to the communication network, the at least one server communicating with the at least one web browser-based gaming machine via at least one communication path, each of the at least one web browser-based gaming machines comprising:

a processor; and a memory including instructions which, when executed by the processor cause the at least one web browser-based gaming machine to:

execute a web browser to display games produced by the at least one server, take over processing from the web browser using a plug-in for the web browser upon detection of a predetermined player interaction with the web browser, carry out a game transaction, using the plug-in for the web browser, including a game bet and an amount wagered for each game played, commit each game transaction, using the plug-in for the web browser, by sending at least the game bet and the amount wagered to the at least one server and to receive a validation transaction corresponding to the committed game transaction back from the at least one server, and relinquish control, using the plug-in for the web browser, back to the web browser upon receipt of the validation transaction from the at least one server, the at least one server including an audit log into which the game bet and the amount wagered for each game transaction is logged.

2. The gaming system of claim 1, wherein the communication network includes the Internet.

3. The gaming system of claim 1, wherein the committed game transaction includes an inbound game payload comprising at least one of a gaming machine ID, a user/player ID, a transaction GUID, a gaming machine originating/return address and a game ID.

4. The gaming system of claim 3, whereby the validation transaction from the at least one server includes an outbound packet comprising at least one of a gaming machine ID, a user/player ID, a transaction GUID, and an outcome of the game.

5. The gaming system of claim 1, wherein the validation transaction includes an outcome of the game.

6. The gaming system of claim 1, wherein the validation transaction includes an outcome of the game, the outcome of the game logged to the audit log.

7. A gaming system coupled to a communication network, comprising:

at least one server coupled to the communication network; and a web browser-based gaming machine coupled to the communication network, the web browser based gaming machine coupled to the at least one server by at least one communication path, the web browser based gaming machine comprising:

a processor; and a memory including instructions which, when executed, cause the processor to:

display games communicated from the at least one server using a web browser;

take over processing from the web browser using a plug-in for the web browser, upon detection of a predetermined player interaction with the web browser;

carry out a game transaction, using the plug-in for the web browser, comprising a game bet and a wager amount;

commit the game transaction to the at least one server, using the plug-in for the web browser, by sending the game bet and the wager amount, the at least one server including an audit log;

log at least the game bet and the wager amount to the audit log using the plug-in for the web browser;

receive a validation from the at least one server, the validation corresponding to the transaction committed to the at least one server, and relinquish control back to the web browser upon receipt of the validation from the at least one server.

8. The gaming system of claim 7, wherein the committed game transaction includes an inbound game payload comprising at least one of a gaming machine ID, a user/player ID, a transaction GUID, a gaming machine originating/return address and a game ID.

9. The gaming system of claim 8, wherein the validation transaction from the at least one server includes an outbound packet comprising at least one of a gaming machine ID, a user/player ID, a transaction GUID, and an outcome of the game.

10. The gaming system of claim 7, wherein the plug-in for the web browser is further configured to log at least the outcome of the game to the audit log.

11. A method, comprising:

displaying games on a web browser-based gaming machine including a web browser, in response to receiving a communication from a server via a communication network;

taking over processing from the web browser upon detection of a predetermined player interaction with the web browser;

carrying out a game transaction comprising a game bet and a wager amount;

committing the game transaction to the server by sending the game bet and the wager amount thereto, the server including an audit log;

logging at least the game bet and the wager amount to the audit log;

receiving a validation from the server, the validation corresponding to the transaction committed to the server; and relinquishing control back to the web browser upon receipt of the validation from the server.

12. The method of claim 11, wherein the committing step is carried out with the game transaction including an inbound game payload comprising at least one of a gaming machine ID, a user/player ID, a transaction GUID, a gaming machine originating/return address and a game ID.

13. The method of claim 12, wherein the receiving step is carried out with the validation from the at least one central transaction server including an outbound packet comprising at least one of a gaming machine ID, a user/player ID, a transaction GUID, and an outcome of the game.

14. The method of claim 11, further comprising logging at least the outcome of the game to the audit log.

* * * * *